(12) United States Patent
Kozakai et al.

(10) Patent No.: US 8,355,381 B2
(45) Date of Patent: Jan. 15, 2013

(54) MOBILE TERMINAL

(75) Inventors: Yasuyuki Kozakai, Kawasaki (JP);
Seijiro Yoneyama, Yokohama (JP);
Wakana Tsuchino, Tokyo (JP);
Masahiro Ishiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 534 days.

(21) Appl. No.: 12/546,870

(22) Filed: Aug. 25, 2009

(65) Prior Publication Data

US 2010/0046473 A1 Feb. 25, 2010

(30) Foreign Application Priority Data

Aug. 25, 2008 (JP) ................................. 2008-215404

(51) Int. Cl.
*H04W 4/00* (2009.01)
(52) U.S. Cl. ........................................ 370/331; 455/437
(58) Field of Classification Search ........................ None
See application file for complete search history.

(56) References Cited

U.S. PATENT DOCUMENTS

| 2005/0053034 | A1* | 3/2005 | Chiueh | 370/331 |
| 2006/0045049 | A1* | 3/2006 | Chung et al. | 370/331 |
| 2008/0165702 | A1* | 7/2008 | Bienas et al. | 370/254 |

FOREIGN PATENT DOCUMENTS

JP 2005-244590 9/2005

OTHER PUBLICATIONS

Perkins, C "IP Mobility Support for IPv4", Aug. 2002, Network Working Group, pp. 1-98.*

* cited by examiner

*Primary Examiner* — Chi Pham
*Assistant Examiner* — Mohammad Adhami
(74) *Attorney, Agent, or Firm* — Oblon, Spivak, McClelland, Maier & Neustadt, L.L.P.

(57) ABSTRACT

When handover is performed from a first network to a second network, a terminal transmits a reply request message to a home agent through the first network after new configuration of a tunnel for transmitting and receiving a packet through the second network. If the terminal receives a reply message corresponding to the reply request message through the first network, the terminal detects that the configuration of the tunnel for transmitting and receiving the packet through the first network can be deleted, and deletes the configuration of the tunnel.

1 Claim, 15 Drawing Sheets

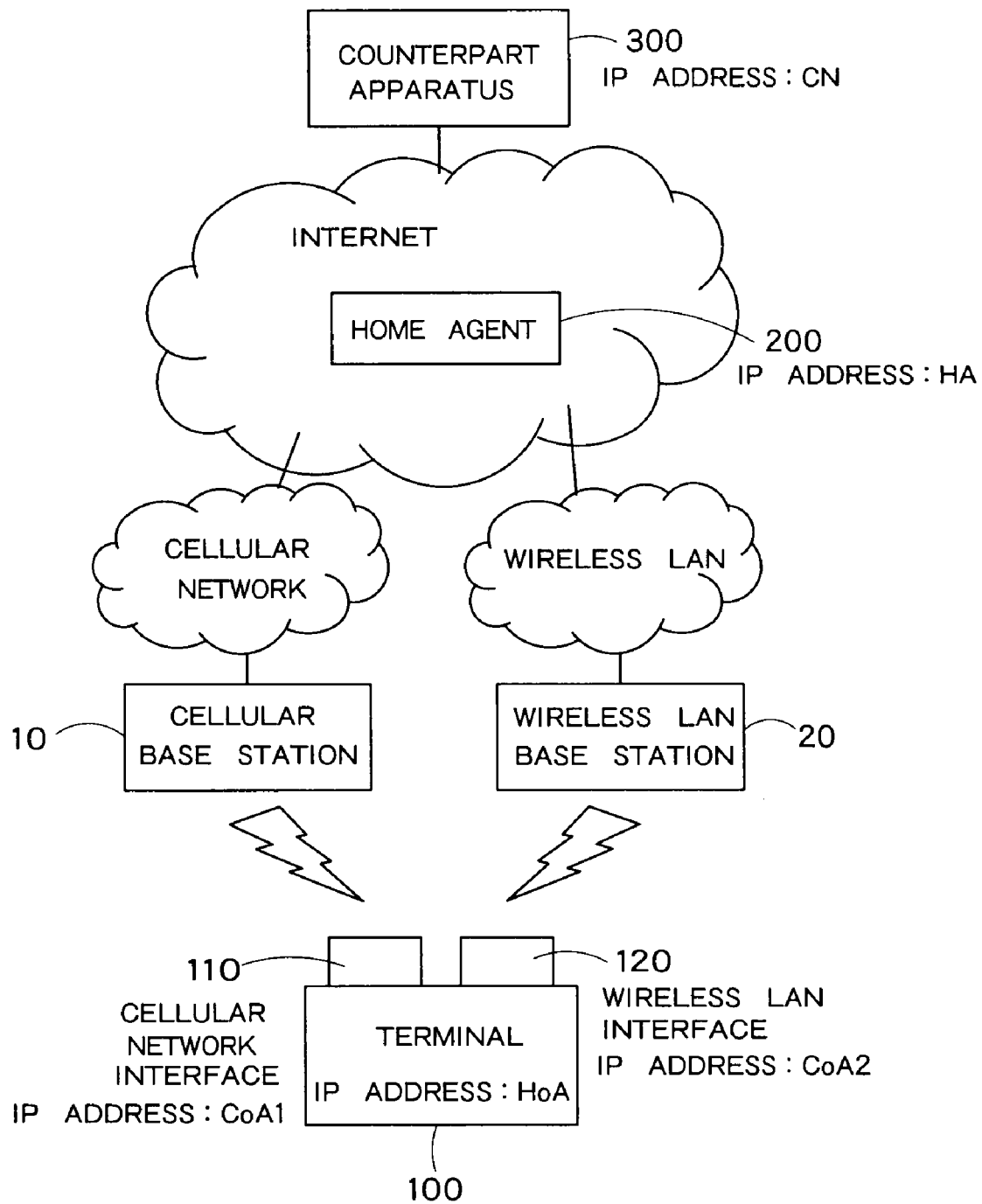
F I G. 1

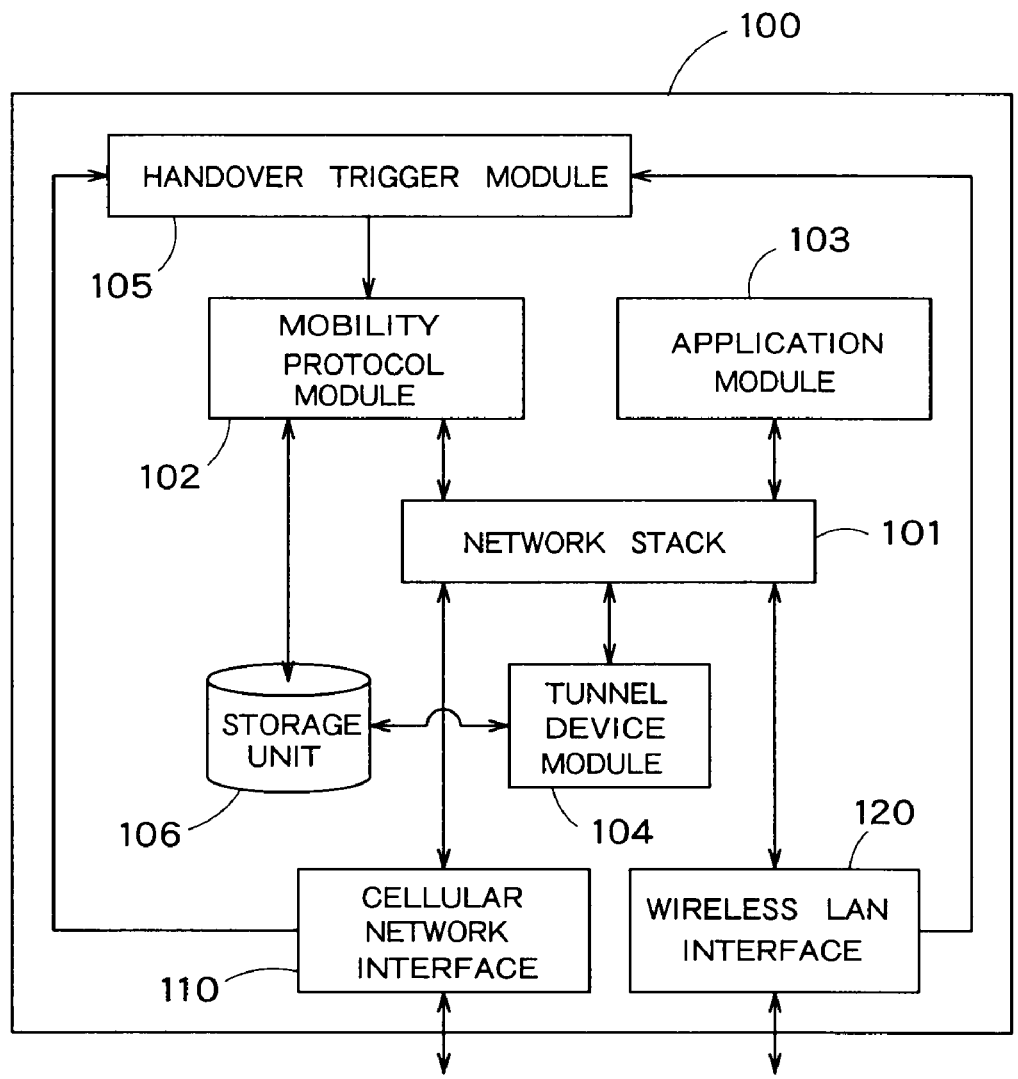
F I G. 2

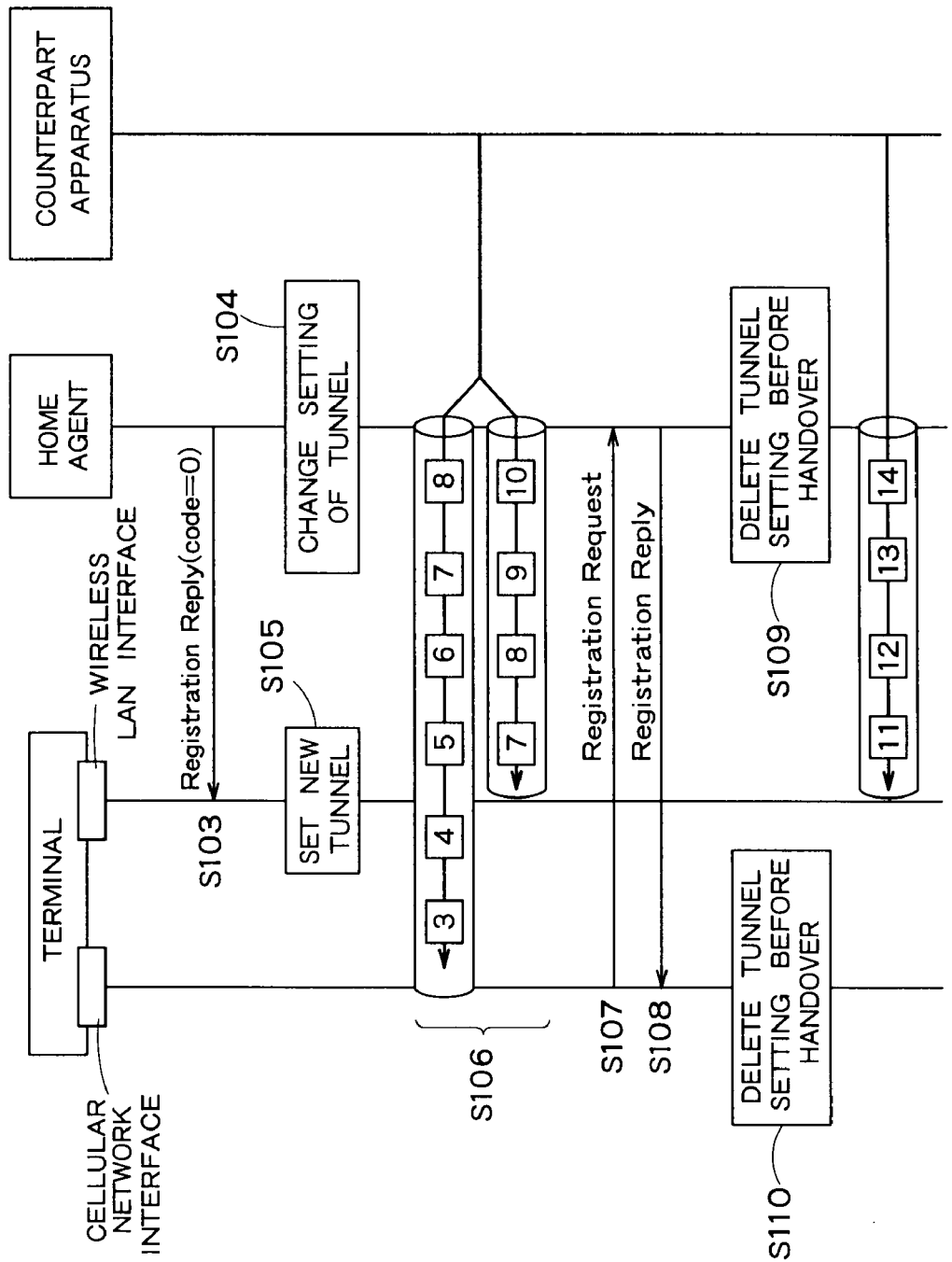
F I G. 4

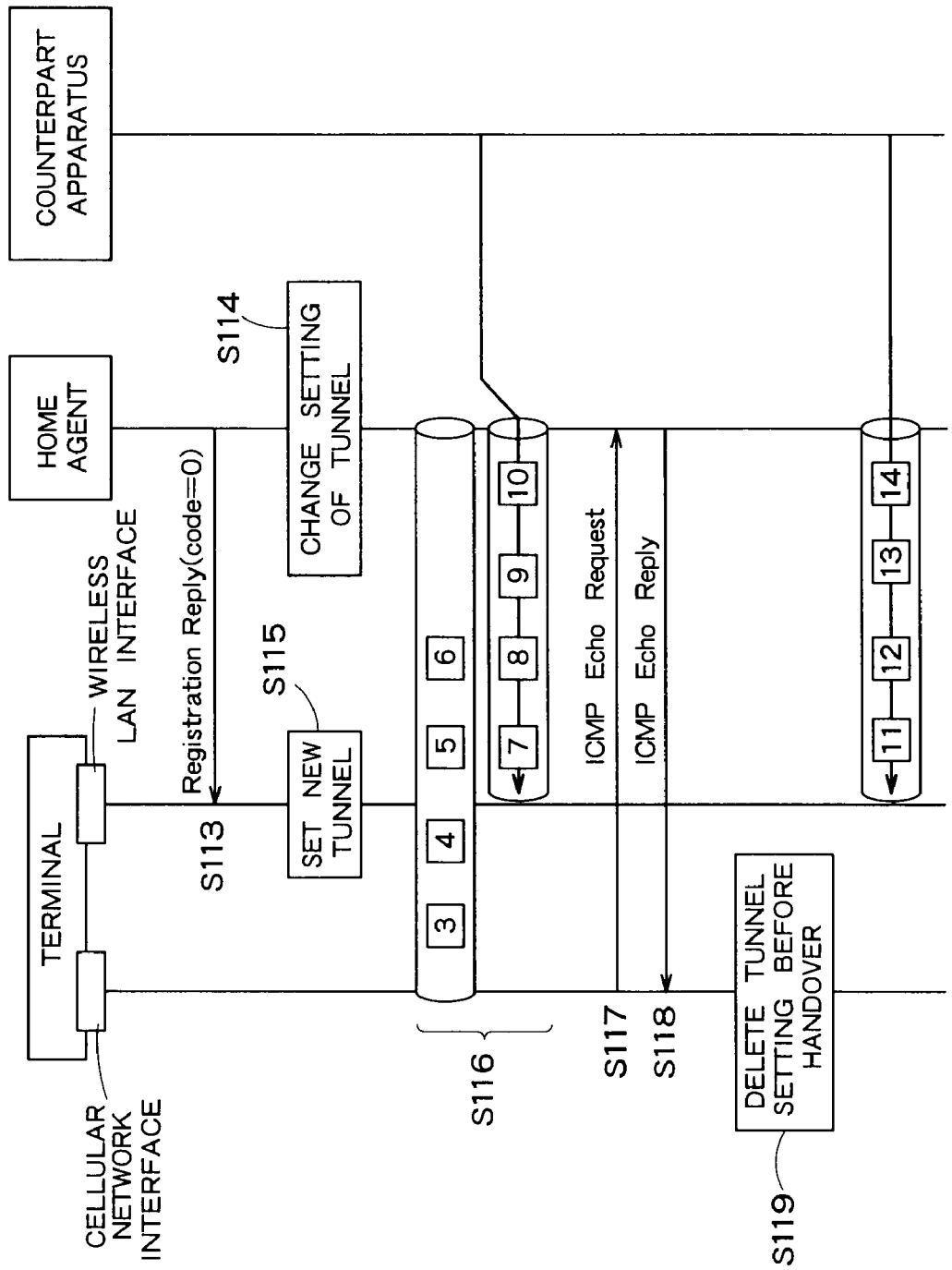
F I G. 5

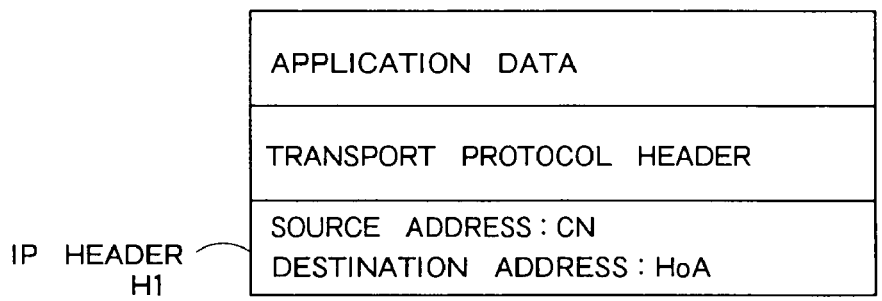
F I G. 6
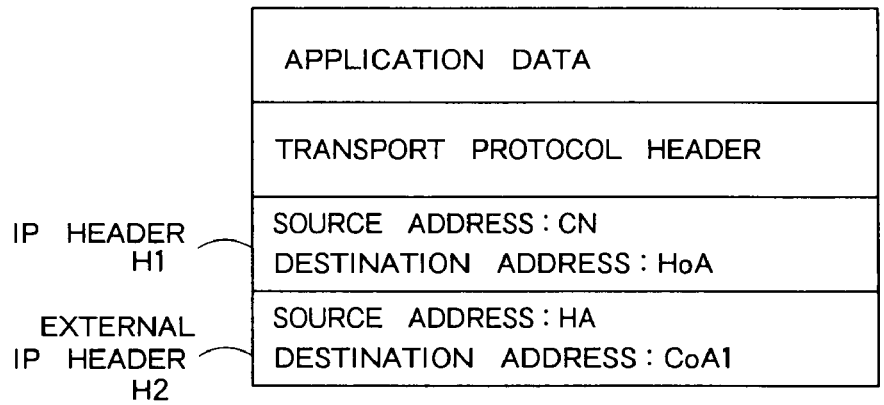
F I G. 7
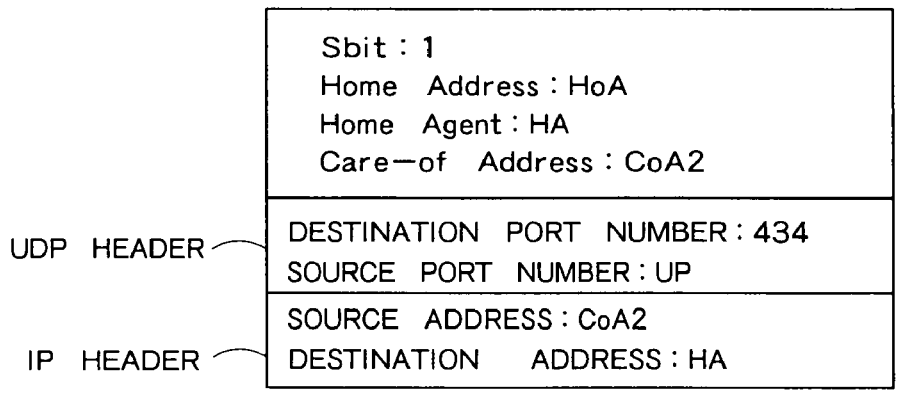
F I G. 8

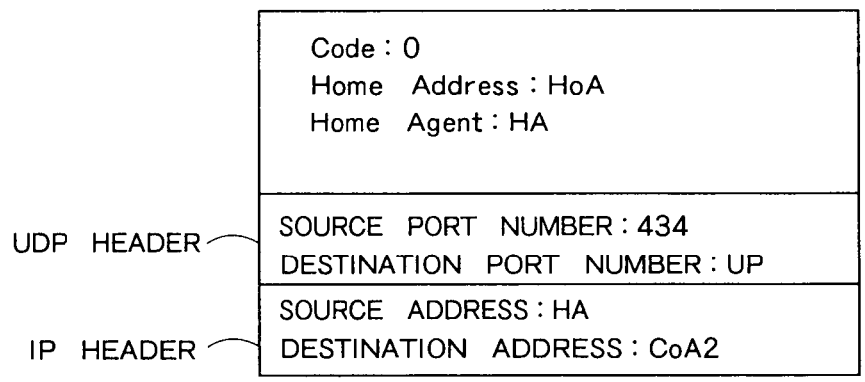
F I G. 9
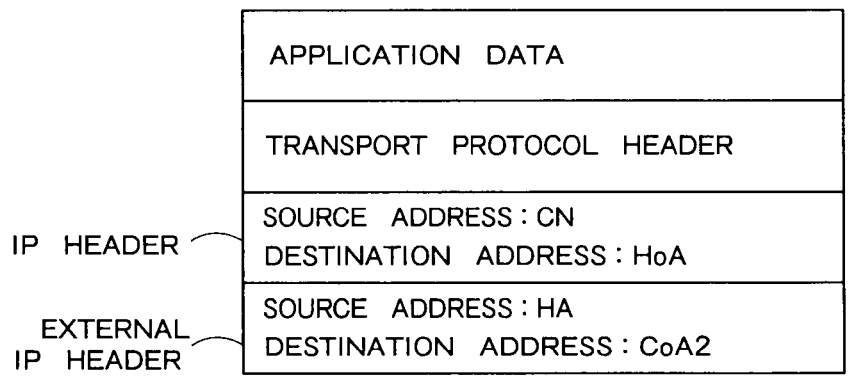
F I G. 10
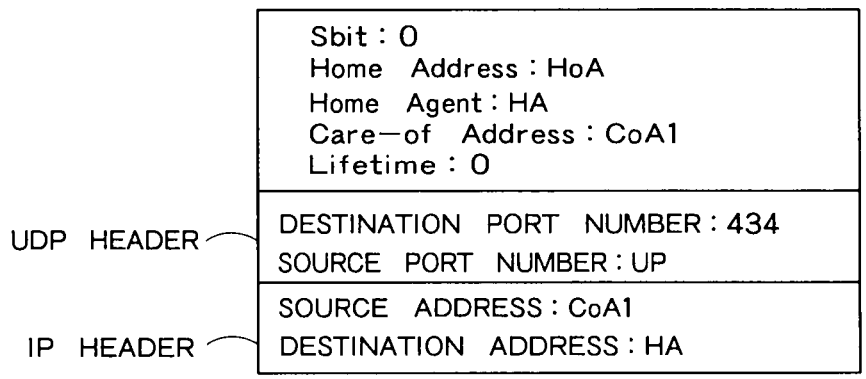
F I G. 11

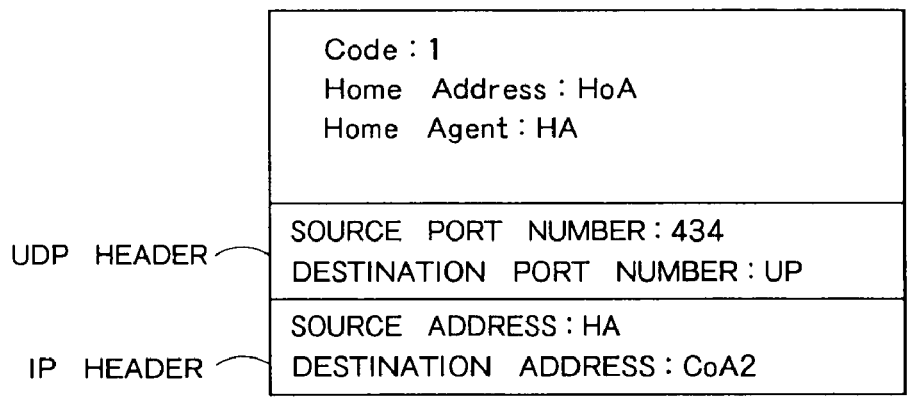
F I G. 12
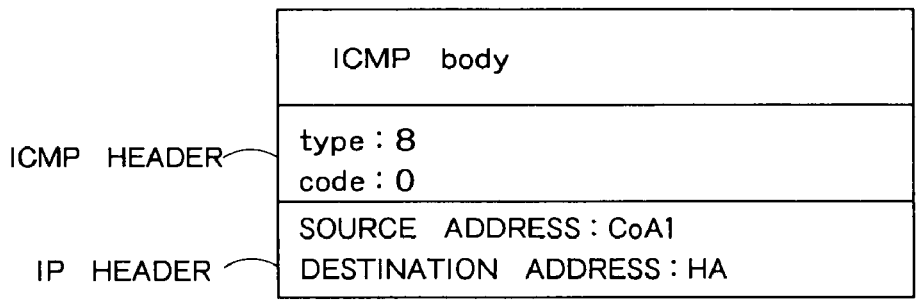
F I G. 13
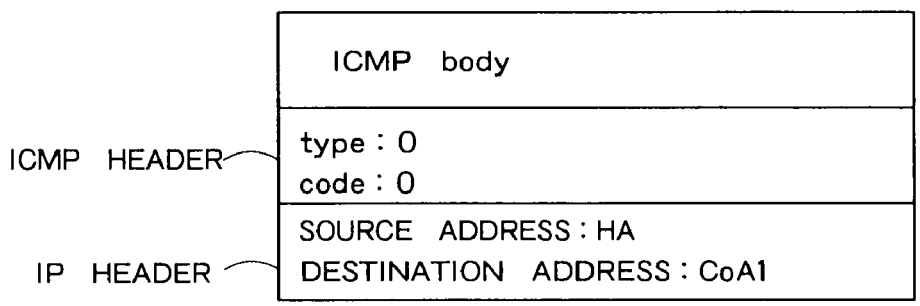
F I G. 14

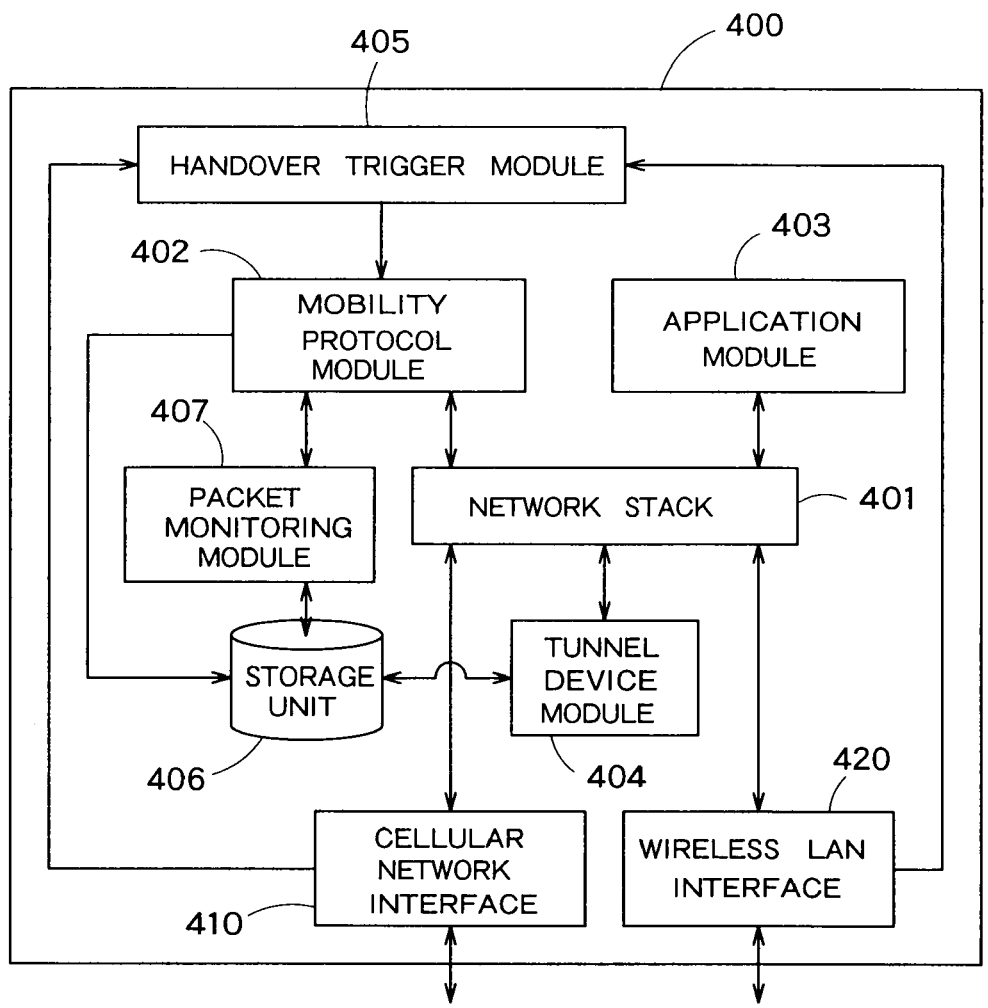
F I G. 16

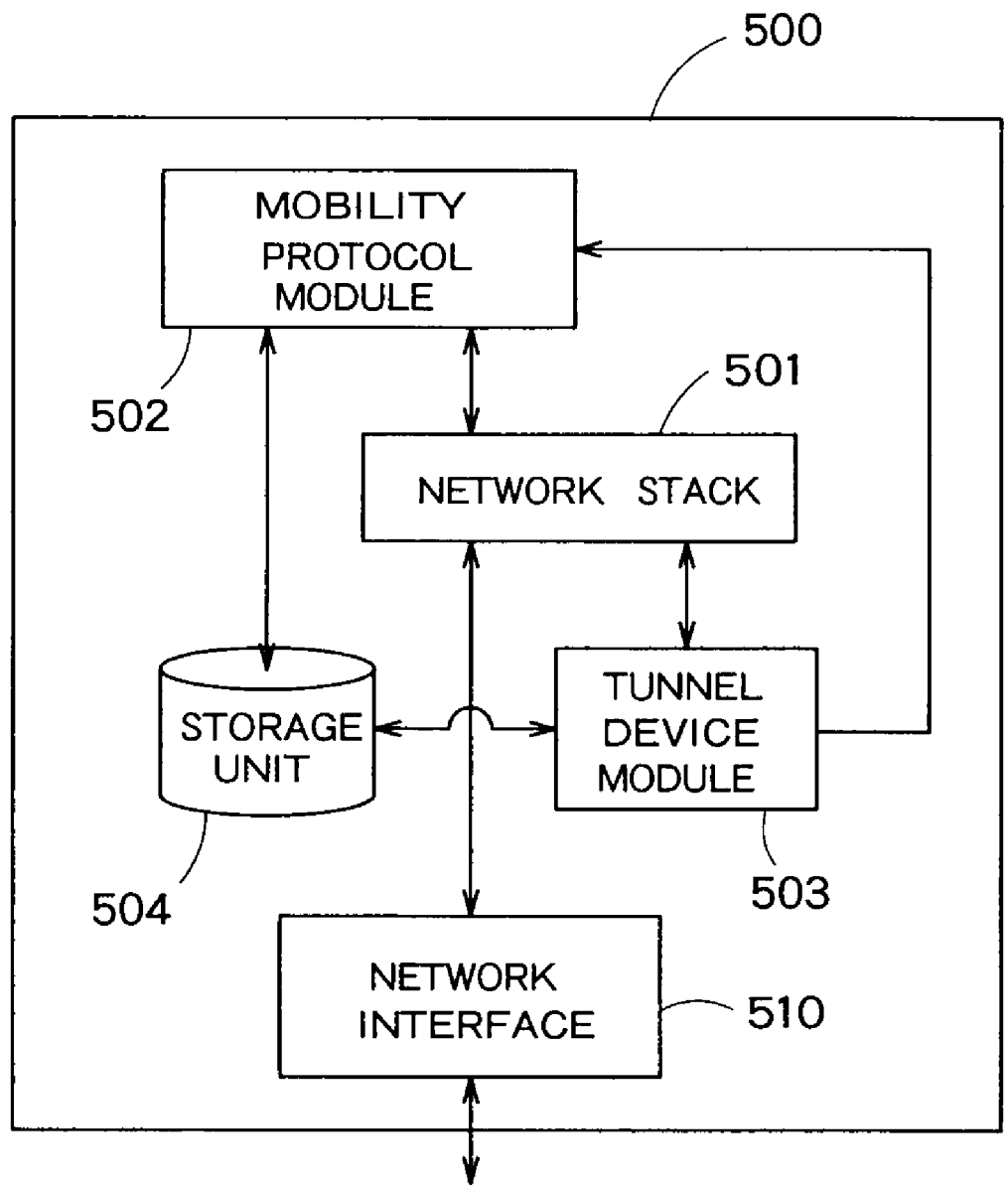
F I G. 17

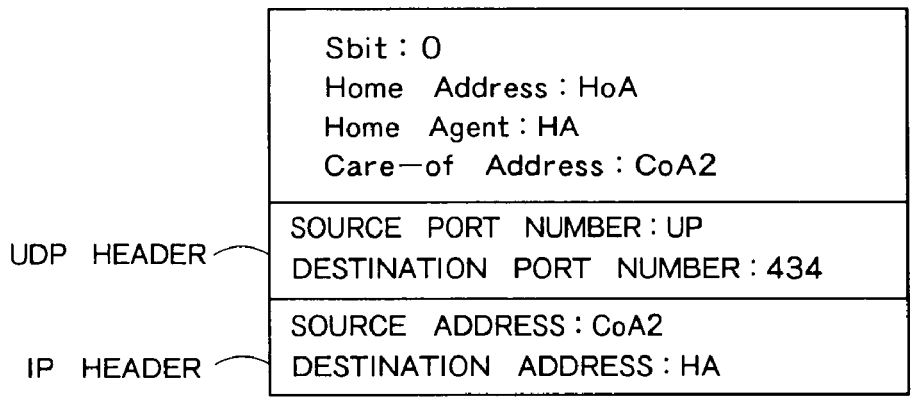
F I G. 19
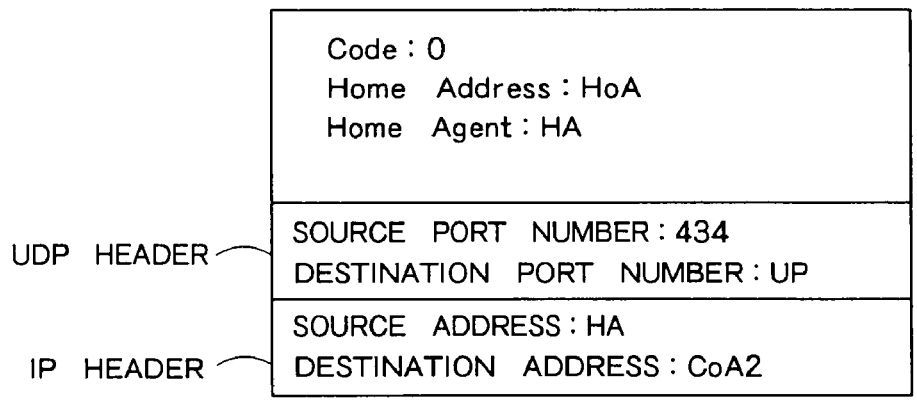
F I G. 20
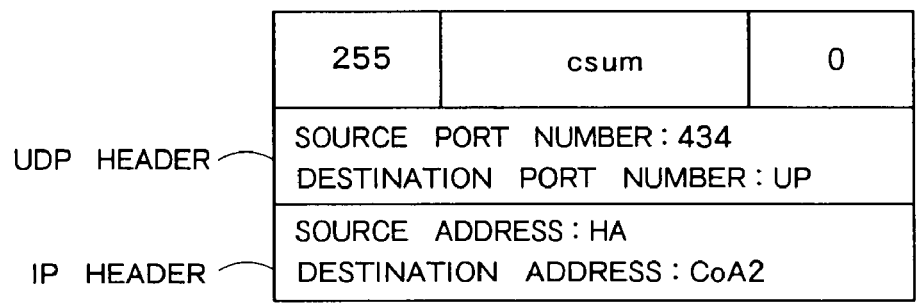
F I G. 21

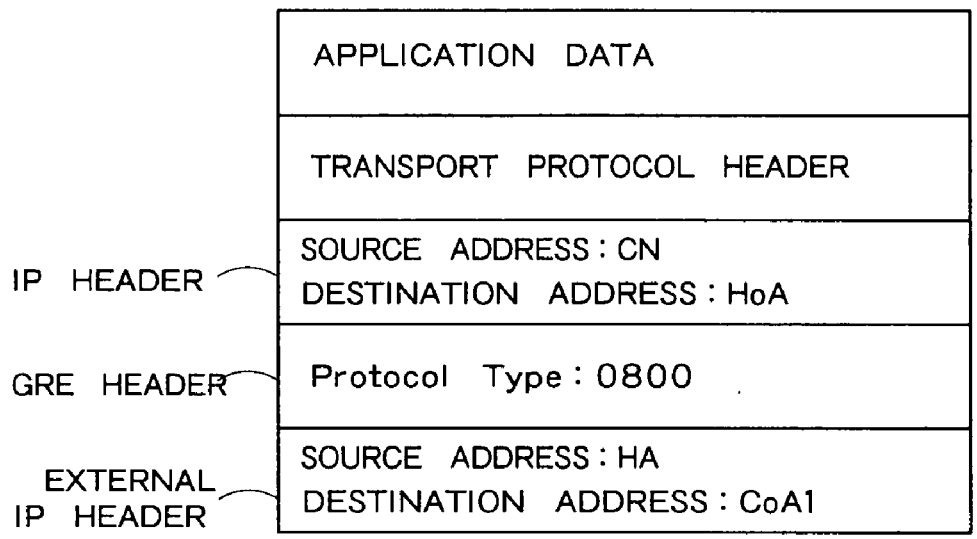
F I G. 23
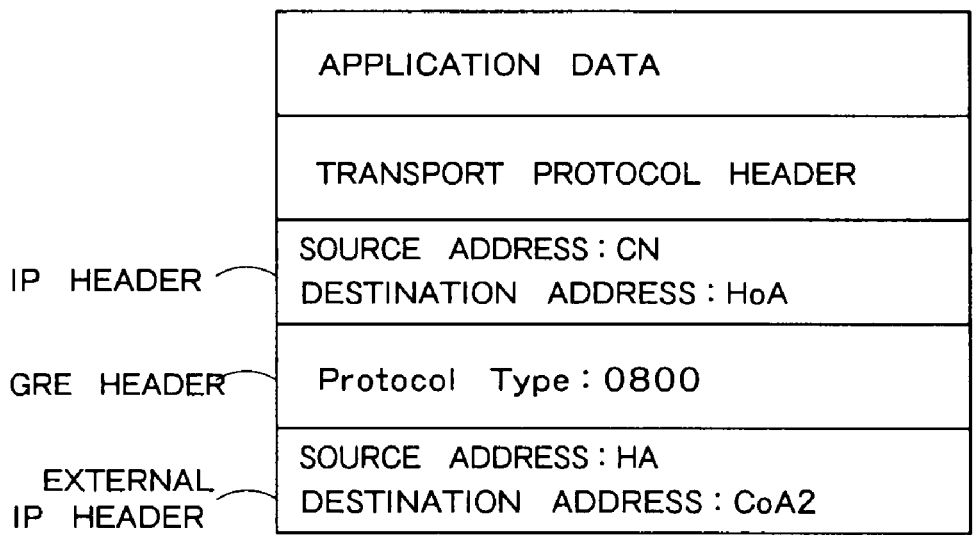
F I G. 24

MOBILE TERMINAL

CROSS REFERENCE TO RELATED APPLICATION

This application is based upon and claims benefit of priority from the Japanese Application No. 2008-215404, filed on Aug. 25, 2008, the entire contents of which are incorporated herein by reference.

BACKGROUND OF THE INVENTION

1. Field of the Invention

The present invention relates to a mobile terminal.

2. Related Art

A handover technique where a mobile terminal switches and uses a plurality of different networks, such as cellular system access networks like a PHS, a GPRS, a CDMA, and an HSDPA and an access network like 802.11 and 802.16, in accordance with a necessity has been known (refer to JP-A 2005-244590 (KOKAI)). The handover technique is generally called a vertical handover technique.

The vertical handover is realized using protocols, such as Mobile IPv4, Mobile IPv6, MOBIKE (IKEv2 Mobility and Multihoming) protocol. Further, it is known that the technique called a soft handover reduces the number of packet losses when a terminal switches the network by these protocols.

Soft handover maintains the connection to the previous network for a while even after the terminal is connected to the new network. As a result, the terminal can securely receive all of the packets passing through the previous network while network switching.

Further, during the handover process, a relay apparatus (home agent) that provides mobility to the terminal also maintains a connection to the previous network after switching the network for a while. As a result, the relay apparatus can securely receive all of the packets passing through the network before switching, during a network switching process and transmit the packets.

A soft handover method according to the related art at the time of vertical handover using Mobile IPv4 will be described. Hereinafter, the soft handover at the time of a vertical handover is simply referred to as handover. In this case, the case where a mobile terminal switches from a cellular network to a wireless LAN will be described.

Before a handover, a tunnel via a cellular network is established between a mobile terminal and a home agent, and a cellular network interface of the mobile terminal receives packets transmitted from a counterpart apparatus.

The mobile terminal determines that it switches the network to a wireless LAN, when the signal strength from a wireless LAN base station becomes sufficiently strong. Then a Registration Request message is transmitted from the wireless LAN interface of the mobile terminal to the home agent.

The home agent receives the Registration Request message and detects that the mobile terminal requires to switch the network. Then the home agent transmits a Registration Reply message, which describes that the mobile terminal is allowed to switch network, to the wireless LAN interface of the mobile terminal.

The home agent changes configurations of the tunnel such that the packet transmitted from the counterpart apparatus is transferred to the wireless LAN interface of the mobile terminal, in accordance with reception of the Registration Request message or transmission of the Registration Reply message.

Further, if the mobile terminal receives the Registration Reply message, the mobile terminal configures a new tunnel so that the mobile terminal can receive the packet transferred from the home agent to the wireless LAN interface. Thereby, the mobile terminal can receive the packet transferred from the home agent by both of the wireless LAN interface and the cellular network interface.

In general, a communication delay of the cellular network is larger than a communication delay of the wireless LAN. For this reason, at a point of time when the packet is first received in the wireless LAN interface, the mobile terminal does not receive the packet that the home agent has transmitted to the cellular network interface of mobile terminal.

Even after establishing the new tunnel through the wireless LAN, the mobile terminal keeps configuration of the tunnel through the cellular network, and deletes the configuration of the tunnel after a sufficient time passes. Thereby, it is possible to receive all of the packets transmitted from the home agent to the cellular network interface without causing a packet loss at the time of the handover.

However, in the handover method according to the related art, since the mobile terminal cannot detect a point of time when the mobile terminal receives all of the packets transmitted from the home agent to the cellular network (network before the handover) interface, the configuration of the tunnel is not deleted for some time after all of the packets are received, and power that is supplied to the cellular network interface cannot be stopped.

In this case, it is not possible to release a memory resource to keep the configuration that allows the packets transmitted from the home agent to be received by the cellular network interface.

SUMMARY OF THE INVENTION

According to one aspect of the present invention, there is provided a mobile terminal that performs handover between a first network and a second network, comprising:

a first interface that transmits and receives data through the first network;

a second interface that transmits and receives data through the second network;

a handover trigger module that determines switching of a used network from the first network to the second network; and a mobility protocol module that generates a handover request message transmitted through the second network on the basis of the determination, provides the handover request message to the second interface, acquires a first reply message corresponding to the handover request message from the second interface, starts transmission and reception of the packet using the second network on receiving the first reply message, generates a reply request message transmitted through the first network on the basis of the first reply message, provides the reply request message to the first interface, acquires a second reply message corresponding to the reply request message from the first interface, and stops utilization of the first network on receiving the second reply message.

According to one aspect of the present invention, there is provided a mobile terminal that performs handover between a first network and a second network, comprising:

a first interface that transmits and receives data through the first network;

a second interface that transmits and receives data through the second network;

a handover trigger module that determines switching of a used network from the first network to the second network; and a mobility protocol module that generates a handover request message transmitted through the second network on the basis of the determination, provides the handover request message to the second interface, acquires from the second interface a reply message corresponding to the handover request message and a message where packet information is described in the message, starts transmission and reception of the packet using the second network on receiving the reply message, and stops utilization of the first network on receiving the packet matched the packet information by the first interface.

According to one aspect of the present invention, there is provided a mobile terminal that performs handover between a first network and a second network, comprising:

a first interface that transmits and receives data through the first network;

a second interface that transmits and receives data through the second network;

a handover trigger module that determines switching of a used network from the first network to the second network;

a packet monitoring module that compares a sequence number described in the packet received by the first interface and a final sequence number and performs a notification when the sequence number and the final sequence number are matched with each other; and a mobility protocol module that generates a handover request message transmitted through the second network on the basis of the determination, provides the handover request message to the second interface, acquires a reply message corresponding to the handover request message from the second interface, starts transmission and reception of the packet using the second network on receiving the reply message, provides a value obtained by subtracting 1 from the sequence number, which is described in the packet first received by the second interface, as the final sequence number to the packet monitoring module, and stops utilization of the first network on the basis of the notification from the packet monitoring module.

BRIEF DESCRIPTION OF THE DRAWINGS

FIG. 1 is a diagram illustrating the schematic configuration of a communication system according to a first embodiment;

FIG. 2 is a diagram illustrating the schematic configuration of a terminal in the communication system according to the first embodiment;

FIG. 4 is a diagram illustrating a process flow at the time of a handover in the communication system according to the first embodiment;

FIG. 5 is a diagram illustrating a process flow at the time of a handover in the communication system according to the first embodiment;

FIG. 6 is a diagram illustrating an example of the configuration of a packet that is transmitted from a counterpart apparatus in the communication system according to the first embodiment;

FIG. 7 is a diagram illustrating an example of the configuration of a packet that is transmitted from a home agent in the communication system according to the first embodiment;

FIG. 8 is a diagram illustrating an example of the configuration of a Registration Request message;

FIG. 9 is a diagram illustrating an example of the configuration of a Registration Reply message;

FIG. 10 is a diagram illustrating an example of the configuration of a packet that is transmitted from a home agent in the communication system according to the first embodiment;

FIG. 11 is a diagram illustrating an example of the configuration of a Registration Request message;

FIG. 12 is a diagram illustrating an example of the configuration of a Registration Reply message;

FIG. 13 is a diagram illustrating an example of the configuration of an ICMP Echo Request message;

FIG. 14 is a diagram illustrating an example of the configuration of an ICMP Echo Reply message;

FIG. 16 is a diagram illustrating the schematic configuration of a terminal in the communication system according to the second embodiment;

FIG. 17 is a diagram illustrating the schematic configuration of a home agent in the communication system according to the second embodiment;

FIG. 19 is a diagram illustrating an example of the configuration of a Registration Request message;

FIG. 20 is a diagram illustrating an example of the configuration of a Registration Reply message;

FIG. 21 is a diagram illustrating an example of the configuration of a notification message;

FIG. 23 is a diagram illustrating an example of the configuration of a packet that is transmitted from a home agent in the communication system according to the third embodiment; and FIG. 24 is a diagram illustrating an example of the configuration of a packet that is transmitted from a home agent in the communication system according to the third embodiment.

DETAILED DESCRIPTION OF THE EMBODIMENTS

Figure 3:
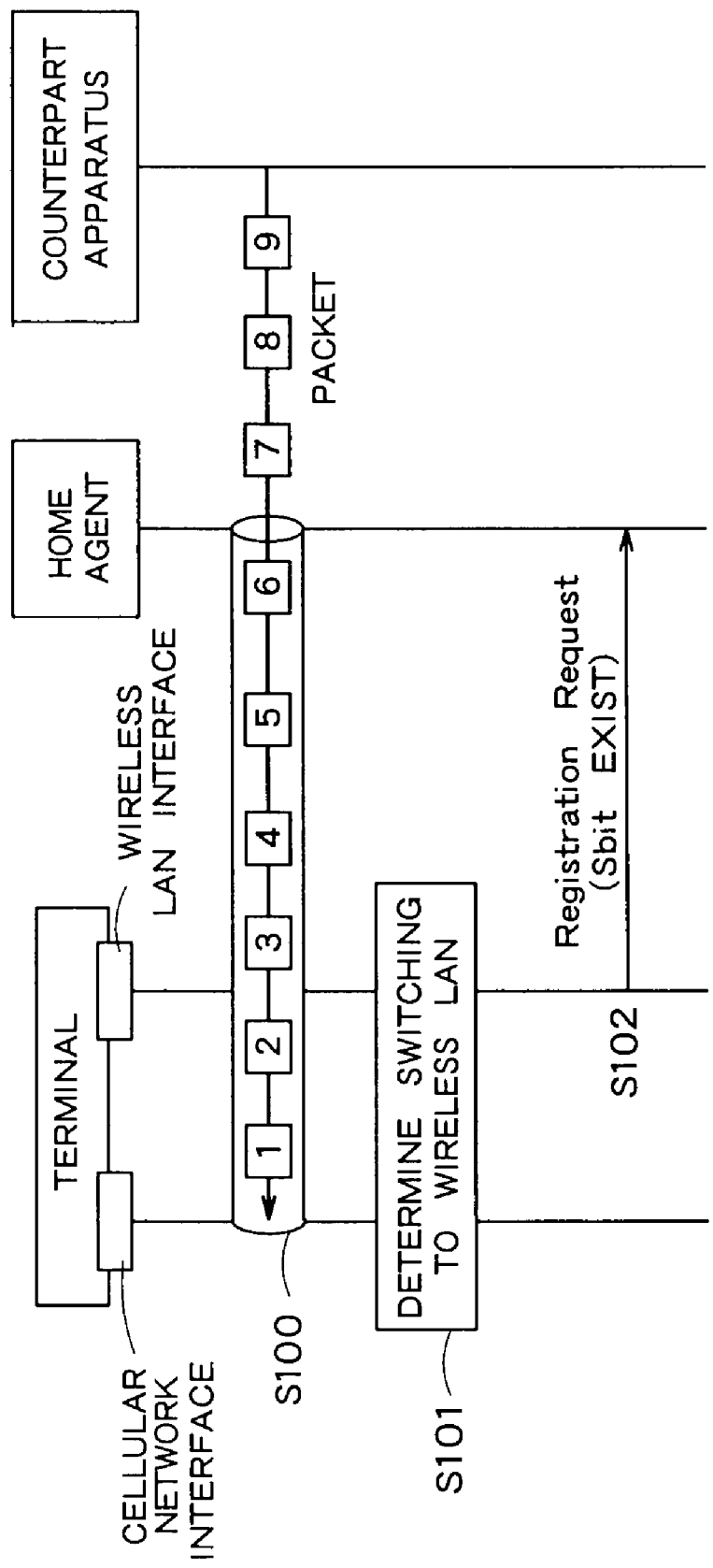
FIG. 3 is a diagram illustrating a process flow at the time of a handover in the communication system according to the first embodiment.

Hereinafter, exemplary embodiments of the present invention will be described with reference to the accompanying drawings.

First Embodiment

FIG. 1 shows the schematic configuration of a communication system according to a first embodiment of the present invention. A terminal 100 communicates with a counterpart apparatus 300 on the Internet. The terminal 100 includes a cellular network interface 110, and can be connected to a cellular network through a cellular base station 10. Further, the terminal 100 includes a wireless LAN interface 120, and can be connected to the wireless LAN through a wireless LAN base station 20.

A home agent 200 provides a mobility function to the terminal 100. The home agent 200 uses an IP-in-IP tunneling protocol to establish a tunnel through the cellular network and/or the wireless LAN between the terminal 100 and the home agent 200, and uses the tunnel to relay a communication packet between the counterpart apparatus 300 and the terminal 100.

In this case, IP addresses that are allocated to the cellular network interface 110 of the terminal 100, the wireless LAN interface 120 thereof, the home agent 200, and the counterpart apparatus 300 are CoA1, CoA2, HA, and CN, respectively. Further, it is assumed that an IP address HoA is allocated to the terminal 100. The IP address HoA is selected such that all of packets where a destination address of an IP header that a router on the Internet analyzes to transfer the packets is HoA are received by the home agent 200.

FIG. 2 shows the schematic configuration of the terminal 100. The terminal 100 has a network stack 101, a mobility protocol module 102, an application module 103, a tunnel device module 104, a handover trigger module 105, a storage unit 106, a cellular network interface 110, and a wireless LAN interface 120.

The network stack 101 processes a transport protocol, such as TCP, UDP, SCTP, DCCP, and ICMP, and a network protocol, such as IPv4 and IPv6. The network stack 101 outputs a packet, which is capsulated by the IP-in-IP protocol and received from the cellular network interface 110 or the wireless LAN interface 120, to the tunnel device module 104.

Further, the network stack 101 outputs application data of the packet, which is received from the tunnel device module 104, to the application module 103. Further, the network stack 101 outputs a data portion other than an IP header and an UDP header of a Registration Reply message, which is received from the cellular network interface 110 or the wireless LAN interface 120, to the mobility protocol module 102.

Further, the network stack 101 adds the UDP header and the IP header to the Registration Request message received from the mobility protocol module 102, and outputs the Registration Request message to the cellular network interface 110 or the wireless LAN interface 120.

The mobility protocol module 102 is a module that generates or processes Mobile IPv4 messages. The mobility protocol module 102 generates the Registration Request message and outputs the Registration Request message to the network stack 101. Further, the mobility protocol module 102 receives the Registration Reply message from the network stack 101 and processes the received Registration Reply message.

The Registration Request message is a message where information indicating a request for network switching (handover) is described, and the Registration Reply message is a message where information indicating permission or non-permission for network switching is described, which will be described in detail below.

Further, the mobility protocol module 102 generates an ICMP Echo Request message and outputs the ICMP Echo Request message to the network stack 101. Further, the mobility protocol module 102 receives the ICMP Echo Reply message from the network stack 101 and processes the ICMP Echo Reply message. The ICMP Echo Request message and the ICMP Echo Reply message will be described in detail below.

The application module 103 processes or analyzes application data that is received from the network stack 101. Further, the application module 103 transmits the application data to the network stack 101.

The tunnel device module 104 performs tunneling a packet by adding an IP header to the packet that is received from the network stack 101 and passing the packet to the cellular network interface 110 or the wireless LAN interface 120 through the network stack 101.

The handover trigger module 105 determines the point of time to start the handover. For example, the handover trigger module 105 acquires from the cellular network interface 110 and/or the wireless LAN interface 120 information related to a communication quality (for example, signal strength of an electric wave) in the cellular network and/or the wireless LAN, determines the point of time to start the handover on the basis of the information, and notifies the mobility protocol module 102 at the time.

The storage unit 106 stores configuration of the tunnel.

The cellular network interface 110 supports a cellular system communication protocol, such as CDMA, HSDPA or PHS.

The cellular network interface 110 outputs the received packet to the network stack 101. Further, the cellular network interface 110 transmits the data, which is output from the network stack 101, to the home agent 200 through the cellular network.

The wireless LAN interface 120 supports an 802.11 system protocol, such as 802.11b, 802.11g, 802.11a, and 802.11n, and outputs the received packet to the network stack 101. Further, the wireless LAN interface 120 transmits data, which is output from the network stack 101, to the home agent 200 through the wireless LAN.

The process flow at the time of a handover in the communication system will be described using FIGS. 3 to 5. In this embodiment, the case where the terminal 100 switches from the cellular network to the wireless LAN will be described.

(Step S100) The terminal 100 uses the tunnel through the cellular network that is established between the terminal 100 and the home agent 200 and receives a packet transmitted from the counterpart apparatus 300. At this time, in the storage unit 106 of the terminal 100, a tuple of CoA1 which is the IP address of the cellular network interface 110 and HA which is the IP address of the home agent 200 is stored as one tunnel configuration.

The home agent 200 uses the IP-in-IP tunneling protocol and transfers the packet, which is transmitted from the counterpart apparatus 300, to the terminal 100.

An example of the packet that is transferred from the counterpart apparatus 300 is shown in FIG. 6. The counterpart apparatus 300 acquires the IP address HoA of the terminal 100 directly from the terminal 100 or using any method before the communication, sets HoA to the destination address included in the IP header H1, and transmits a packet.

An example of a packet that is transmitted by the home agent 200 is shown in FIG. 7. The home agent 200 acquires an IP address CoA1 that is allocated to the cellular network interface 110 of the terminal 100 in accordance with a specification of Mobile IPv4. In addition, the home agent 200 sets the destination address of an external IP header H2 to CoA1, adds the external IP header H2 to a front of the IP header H1, and transfers a packet to the terminal 100.

If the cellular network interface 110 of the terminal 100 receives a packet shown in FIG. 7 from the home agent 200, the cellular network interface 110 outputs the received packet to the network stack 101.

The network stack 101 detects that the next header to the external IP header H2 of the packet is an IP header, and outputs the packet to the tunnel device module 104.

The tunnel device module 104 acquires tunnel configuration from the storage unit 106, and compares the tuple of IP addresses included in the tunnel configuration and the tuple of the destination address and the source address in the external IP header H2. As the comparison result, if the two tuples are the same, the tunnel device module 104 determines that the packet is a normal packet, deletes the external IP header H2, and outputs the packet to the network stack 101.

The network stack 101 detects that the next header to the IP header H1 is a transport protocol header, and executes a reception process according to a specification of the transport protocol. Then, the network stack 101 outputs application data of the packet to the application module 103.

The application module 103 uses the application data that is received from the network stack 101, and executes a predetermined process.

(Step S101) The handover trigger module 105 of the terminal 100 determines to start a handover (switching from the cellular network to the wireless LAN).

The handover trigger module 105 always acquires information related to a communication quality in the cellular network and/or the wireless LAN from the cellular network interface 110 and/or the wireless LAN interface 120.

If the information or the other information satisfies a predetermined condition, the handover trigger module 105 determines to start the handover, and notifies the mobility protocol module 102 of the determination.

An algorithm that is used when the handover trigger module 105 determines to start the handover is not limited. As an example, there is a method in which signal strength of an electric wave received from the wireless LAN base station 20 becoming sufficiently strong is used as a handover trigger.

(Step S102) The Registration Request message is transmitted to the home agent 200 from the terminal 100 through the wireless LAN.

If the mobility protocol module 102 receives a notification indicating a handover start from the handover trigger module 105, the mobility protocol module 102 generates the Registration Request message.

The mobility protocol module 102 sets 1 to Sbit of the Registration Request message, a value other than 0 to a Lifetime field, an IP address HoA allocated to the terminal 100 to a Home Address field, an IP address HA of the home agent to a home agent field, and an IP address CoA2 of the wireless LAN interface 120 to a Care-of Address field.

The Registration Request message that is generated by the mobility protocol module 102 is output to the network stack 101. The network stack 101 adds a UDP header where a destination port number is 434 to the Registration Request message. At this time, it is assumed that a value of the source port number in the UDP header by the network stack 101 is UP.

Further, the network stack 101 adds an IP header, where the destination address is HA which is the IP address of the home agent 200 and the source address is the CoA2 which is IP address of the wireless LAN interface in the terminal 100, to the Registration Request message. Thereby, the Registration Request message is formed as the packet shown in FIG. 8.

The Network stack 101 outputs the Registration Request message to the wireless LAN interface 120. The wireless LAN interface 120 transmits the received Registration Request message to the home agent 200 through the wireless LAN.

The sequence after Step S102 is different depending on whether the home agent 200 supports the Simultaneous registration. First, the case where the home agent 200 supports the Simultaneous registration will be described using FIG. 4.

(Step S103) If the home agent 200 that supports the Simultaneous registration determines to accept a request from the terminal 100, the home agent 200 transmits the Registration Reply message shown in FIG. 9 to the wireless LAN interface 120 of the terminal 100.

A Code field of the Registration Reply message is 0, the Home Address field is the IP address HoA of the terminal 100, and the Home Agent field is the IP address HA of the home agent 200.

Further, a UDP header where the source port number is 434 and the destination port number is UP and an IP header where the source address is HA which is the IP address of the home agent 200 and the destination address is CoA2 which is the IP address of the wireless LAN interface 120 on the terminal 100 are added to the Registration Reply message.

(Step S104) In a state where the home agent 200 maintains the tunnel configuration to transfer the packet to the cellular network interface 110 of the terminal 100, the home agent 200 configures a new tunnel needed to transfer the packet to the wireless LAN interface 120.

(Step S105) The terminal 100 stores the configuration of the new tunnel needed to receive the packet transferred from the home agent 200 through the wireless LAN by the wireless LAN interface 120 in the storage unit 106.

The wireless LAN interface 120 of the terminal 100 outputs the received Registration Reply message to the network stack 101.

Since the transport protocol header of the Registration Reply message is a UDP and the destination port number is UP, the network stack 101 detects that the destination of the Registration Reply message is the mobility protocol module 102, and outputs the Registration Reply message to the mobility protocol module 102.

Since the Code field of the Registration Reply message is 0, the mobility protocol module 102 detects that the home agent 200 accepts the request with the Registration Request message and supports Simultaneous registration. Further, the mobility protocol module 102 stores, in a storage unit 106, the tuple of CoA2 which is the IP address of the wireless LAN interface 120 and HA which is the IP address of the home agent 200 as new tunnel configuration.

At this time, the configuration of the tunnel that is needed to receive the packet transferred from the home agent 200 through the cellular network by the cellular network interface 110 is not deleted and held.

(Step S106) The packet that is transferred from the counterpart apparatus 300 is transmitted to the cellular network interface 110 and the wireless LAN interface 120.

If the home agent 200 receives a packet that is transmitted from the counterpart apparatus 300 and has a destination address as HoA, the home agent 200 copies the packet. In addition, the home agent 200 adds to one packet an external IP header where the destination address is CoA1 which is the IP address of the cellular network interface 110 in the terminal 100 (refer to FIG. 7), and transfers the packet to the cellular network interface 110.

Further, the home agent 200 adds the external IP header (shown in FIG. 10) where the destination address is CoA2 which is IP address of the wireless LAN interface 120 in the terminal 100 to the other copied packet, and transfers the other copied packet to the wireless LAN interface 120.

(Step S107) The terminal 100 generates the Registration Request message, and transmits the Registration Request message to the home agent 200.

As the detection result of the home agent 200 supporting the Simultaneous registration in Step S105, the mobility protocol module 102 generates a Registration Request message where 0 is set to Sbit, 0 is set to a Lifetime field, HoA which is the IP address of the terminal 100 is set to a Home Address field, the HA which is IP address of the home agent 200 is set to a Home Agent field, and CoA1 which is IP address of the cellular network interface 110 on the terminal 100 is set to a Care-of Address field.

Since the Lifetime field is 0 and values of the Home Agent Field and the Care-of Address field are different from each other, it is assumed that the Registration Request message indicates a request to delete configuration of the tunnel used before the handover.

The mobility protocol module 102 outputs the generated Registration Request message to the network stack 101. The network stack 101 adds a UDP header where the destination port number is 434 and the source port number is UP to the Registration Request message, as shown in FIG. 11.

Further, the network stack 101 adds an IP header where the destination address is HA which is IP address of the home agent 200 and the source address is CoA1 which is the IP address of the cellular network interface 110 on the terminal 100 to the Registration Request message.

In addition, the network stack 101 outputs the Registration Request message to the cellular network interface 110. The cellular network interface 110 transmits the received Registration Request message to the home agent 200.

After the new tunnel is configured (Step S105), the terminal 100 concurrently performs transmission of the Registration Request message and the reception process (Step S106) of the packet transferred from the home agent 200.

(Step S108) If the home agent 200 accepts to delete the configuration of the tunnel used before the handover, the home agent 200 transmits the Registration Reply message to the cellular network interface 110 of the terminal 100. The structure of Registration Reply message is the same as that shown in FIG. 9 but the destination address of the IP header is CoA1.

(Step S109) The home agent 200 deletes the configuration of the tunnel used before the handover. Then, the home agent 200 that has received the packet where the destination address is HoA from the counterpart apparatus 300 adds an external IP header where the destination address is CoA2 which is the IP address of the wireless LAN interface 120 on the terminal 100 to the packet, and transfers the packet to only the wireless LAN interface 120 of the terminal 100.

(Step S110) The terminal 100 deletes the configuration of the tunnel used before the handover on the basis of the Registration Reply message that is transmitted from the home agent 200 in Step S108.

The cellular network interface 110 of the terminal 100 outputs the received Registration Reply message to the network stack 101. The Registration Reply message is transmitted from the home agent 200 at timing later than transmission timing of the packet that is finally transferred to the cellular network interface 110 of the terminal 100 by the home agent 200 before Step S104. Accordingly, the cellular network interface 110 receives the Registration Reply message later than the packet, as long as the transfer order of the packets is not changed in the cellular network.

Since the transport protocol header of the Registration Reply message is UDP and the destination port number is the same as the source port number of the Registration Request message, the network stack 101 detects that the destination of the Registration Reply message is the mobility protocol module 102, and outputs the Registration Reply message to the mobility protocol module 102.

Since a Code field of the Registration Reply message is 0, the mobility protocol module 102 detects that the home agent 200 accepts the request with the Registration Request message.

In addition, the mobility protocol module 102 deletes configuration of the tunnel, which is matched to the tuple of the CoA1 which is IP address of the cellular network interface 110 and HA which is the IP address of the home agent 200, from the storage unit 106.

Thereby, when the cellular network interface 110 of the terminal 100 receives the same packet as the packet shown in FIG. 7, the tunnel device module 104 of the terminal 100 determines that the packet is an abnormal packet because the configuration of the tunnel matched with the source address of the external IP header of the packet and the destination address does not exist in the storage unit 106, and can discard the packet.

Next, the case where the home agent 200 does not support the Simultaneous registration will be described using FIG. 5. Step S113 is a step subsequent to Step S102 shown in FIG. 3.

(Step S113) If the home agent 200 that does not support the Simultaneous registration determines to accept a tunnel configuration request from the terminal 100, the home agent 200 transmits the Registration Reply message shown in FIG. 12 to the wireless LAN interface 120 of the terminal 100.

Since the Code field is 1, the Registration Reply message indicates that the home agent 200 does not support the Simultaneous registration. The Home Address field is the HoA which is IP address of the terminal 100, and the Home Agent field is HA which is the IP address of the home agent 200. Further, a UDP header where the source port number is 434 and the destination port number is UP is added to the Registration Reply message.

Further, an IP header where the source address is HA which is the IP address of the home agent 200 and the destination address is CoA2 which is the IP address of the wireless LAN interface 120 on the terminal 100, is added to the Registration Reply message.

(Step S114) The home agent 200 changes configuration of the tunnel so as to transfer the packet to the wireless LAN interface 120.

(Step S115) The terminal 100 configures a new tunnel on the basis of the Registration Reply message so that the wireless LAN interface 120 can receive the packet transferred from the home agent 200 through the wireless LAN.

The wireless LAN interface 120 of the terminal 100 outputs the received Registration Reply message to the network stack 101.

Since the transport protocol header of the Registration Reply message is a UDP and the destination port number is UP, the network stack 101 detects that the destination of the Registration Reply message is the mobility protocol module 102, and outputs the Registration Reply message to the mobility protocol module 102.

Since the Code field of the Registration Reply message is 1, the home agent 200 accepts the changing of the tunnel by the Registration Request message. However, since the home agent 200 does not support the Simultaneous registration, the mobility protocol module 102 detects that the configuration of the tunnel set before Step S114 is deleted. Further, in the storage unit 106, the tuple of CoA2 which is the IP address 2 of the wireless LAN interface 120 and HA which is the IP address of the home agent 200, is stored as new tunnel configuration.

(Step S116) If the home agent 200 receives a packet where the destination address is HoA from the counterpart apparatus 300, the home agent 200 adds an IP header where the destination address is CoA2 which is the IP address of the wireless LAN interface 120 on the terminal 100 to the packet, and transmits the packet to only the wireless LAN interface 120.

Further, different from the case where the home agent 200 supports the Simultaneous registration, the home agent 200 does not transfer the packet to the cellular network interface 110.

If the packet transferred from the home agent 200 is received by the cellular network interface 110 or the wireless LAN interface 120, the terminal 100 executes a packet reception process. However, different from the case where the home agent 200 supports the Simultaneous registration, the terminal 100 does not receive the overlapped packet. Accordingly, the application module 103 and the tunnel device module 104 of the terminal 100 do not execute a discarding process on the overlapped packet.

(Step S117) The terminal 100 transmits an ICMP Echo Request message to the home agent 200.

The mobility protocol module 102 of the terminal 100 detects that the home agent 200 does not support the Simultaneous registration from the Registration Reply message, and generates an ICMP Echo Request message that includes an ICMP body composed of arbitrary data. The mobility protocol module 102 outputs the generated ICMP Echo Request message to the network stack 101.

The network stack 101 adds, to the received ICMP Echo Request message, an IP header where the destination address is HA which is the IP address of the home agent 200 and the source address is CoA1 which is the IP address of the cellular network interface 110 on the terminal, as shown in FIG. 13. In addition, the network stack outputs the ICMP Echo Request message to the cellular network interface 110.

The cellular network interface 110 transmits the received ICMP Echo Request message to the home agent 200.

After the new tunnel is configured (Step S115), the terminal 100 concurrently performs transmission of the ICMP Echo Request message and the reception process (Step S116) of the packet transferred from the home agent 200.

(Step S118) If the home agent 200 receives the ICMP Echo Request message, the home agent 200 transmits the ICMP Echo Reply message shown in FIG. 14 to the cellular network interface 110 of the terminal 100.

(Step S119) After receiving the ICMP Echo Reply message that is transmitted from the home agent 200, the terminal 100 deletes the configuration of the tunnel used before the handover.

The cellular network interface 110 outputs the received ICMP Echo Reply message to the network stack 101. The ICMP Echo Reply message is transmitted from the home agent 200 at a timing later than transfer timing of the packet that is finally transferred to the cellular network interface 110 of the terminal 100 by the home agent 200 before Step S114. Accordingly, the terminal 100 receives the ICMP Echo Reply message later than the packet, as long as the transfer order of the packets is not changed in the cellular network.

The network stack 101 outputs the ICMP Echo Reply message to the mobility protocol module 102.

The mobility protocol module 102 deletes configuration of the tunnel, which is matched to the tuple of CoA1 which is the IP address of the cellular network interface 110 and HA which is the IP address of the home agent 200, from the storage unit 106.

Thereby, when the cellular network interface 110 of the terminal 100 receives the same packet as the packet shown in FIG. 7, the tunnel device module 104 determines that the packet is an abnormal packet because the configuration of the tunnel matched with the source address and the destination address of the external IP header of the packet does not exist in the storage unit 106, and can discard the packet.

The terminal 100 according to this embodiment transmits the Registration Request message where Sbit is 1 to the home agent 200, and inspects the Code field of the Registration Reply message received from the home agent 200, thereby detecting whether the home agent 200 supports the Simultaneous registration.

In addition, when the home agent 200 supports the Simultaneous registration, after transmitting the Registration Request message to the home agent 200, the terminal detects the time when the Registration Reply message is received through the network used before the handover as the time when the tunnel used before the handover can be deleted.

Meanwhile, when the home agent 200 does not support to the Simultaneous registration, after transmitting the ICMP Echo Request message to the home agent 200, the terminal detects the point of time when the ICMP Echo Reply message is received through the network used before the handover as a point of time when the tunnel used before the handover can be deleted.

As such, without depending on whether the home agent 200 supports to the Simultaneous registration, the terminal 100 can receive all of the packets that are transferred from the home agent 200 through the tunnel used before the handover and detect a point of time when the tunnel can be deleted.

The point of time when the tunnel can be deleted is detected and the tunnel is deleted, thereby quickly cutting power that is supplied to the interface of the terminal corresponding to the network used before the handover. Accordingly, it is possible to reduce power consumption.

Further, since it is possible to quickly release a memory resource that is used to hold tunnel configuration to receive the packet transferred from the home agent by the interface on the terminal corresponding to the network used before the handover, the memory resource can be effectively used.

The terminal 100 may transmit a Registration Request message, instead of the ICMP Echo Request message in the first embodiment. In the Registration Request message, 0 is set to Sbit, a value other than 0 is set to a Lifetime field, HoA which is the IP address of the terminal 100 is set to a Home Address field, HA which is the IP address of the home agent 200 is set to a Home Agent field, CoA1 which is the IP address of the cellular network interface 110 on the terminal 100 is set to a Care-of Address field, 434 is set to the destination port number of the UDP header, UP is set to the source port number, CoA2 which is the IP address of the wireless LAN interface 120 on the terminal 100 is set to the source address, and HA which is the IP address of the home agent 200 is set to the destination address.

In this case, the terminal 100 deletes the configuration of the tunnel used before the handover, after receiving the Registration Reply message with respect to the Registration Request message.

Further, instead of the ICMP Echo Request message, the home agent 200 can use a message that makes it possible to transmit a reply message.

In the first embodiment, the terminal 100 and the home agent 200 employs Mobile IPv4 as a mobility protocol, but Mobile IPv6 may be employed instead of the Mobile IPv4.

When the terminal 100 and the home agent 200 use the Mobile IPv6, the terminal and the home agent support Multiple Care-of Address Registration described in the standardization. In addition, a Binding Update message of the Mobile IPv6 may be used instead of the Registration Request message, and a Binding Acknowledgement message may be used instead of the Registration Reply message.

When the terminal uses the Binding Update message, a C flag field in Binding Identifier mobility Option of the Binding Update message is set to 1 and Status field of Binding Acknowledgement message is inspected. Thereby, a message, such as the ICMP Echo Request message, may be transmitted, when the home agent does not support the Multiple Care-of Address Registration function.

In the first embodiment, the terminal 100 may transmit the tunneled packet in Steps S100, S106, and S116 to the home agent 200, thereby transmitting the packet to the counterpart apparatus 300.

Further, in the first embodiment, before at least Step S102, in the case that the home agent 200 does not support the Simultaneous registration is detected by the terminal 100 or the case that the terminal 100 is configured not to support Simultaneous registration, in Step S102, terminal 100 may transmit the Registration request message where Sbit is set to 0 to the home agent 200.

In that case, if the Code field of the Registration reply message that the terminal 100 receives from the home agent 200 with respect to the Registration request message is 0, the terminal 100 may transmit the ICMP Echo request message in Step S117 and receives the ICMP Echo reply message in Step S118. Then, the terminal 100 may immediately delete configuration of the tunnel used before the handover in Step S119.

Further, in the first embodiment, the terminal 100 may stop the operation of the network interface used before the handover or stop power supply, after deleting the configuration of the tunnel used before the handover or immediately before deleting the configuration of the tunnel.

Further, in the first embodiment, the terminal may stop the operation of the network interface used before the handover or stop power supply, instead of deleting the configuration of the tunnel used before the handover.

Further, in the first embodiment, the tunnel device module 104 of the terminal 100 may use a GRE tunnel or the other tunneling protocol, instead of the IP-in-IP tunneling protocol.

Second Embodiment

Figure 15:
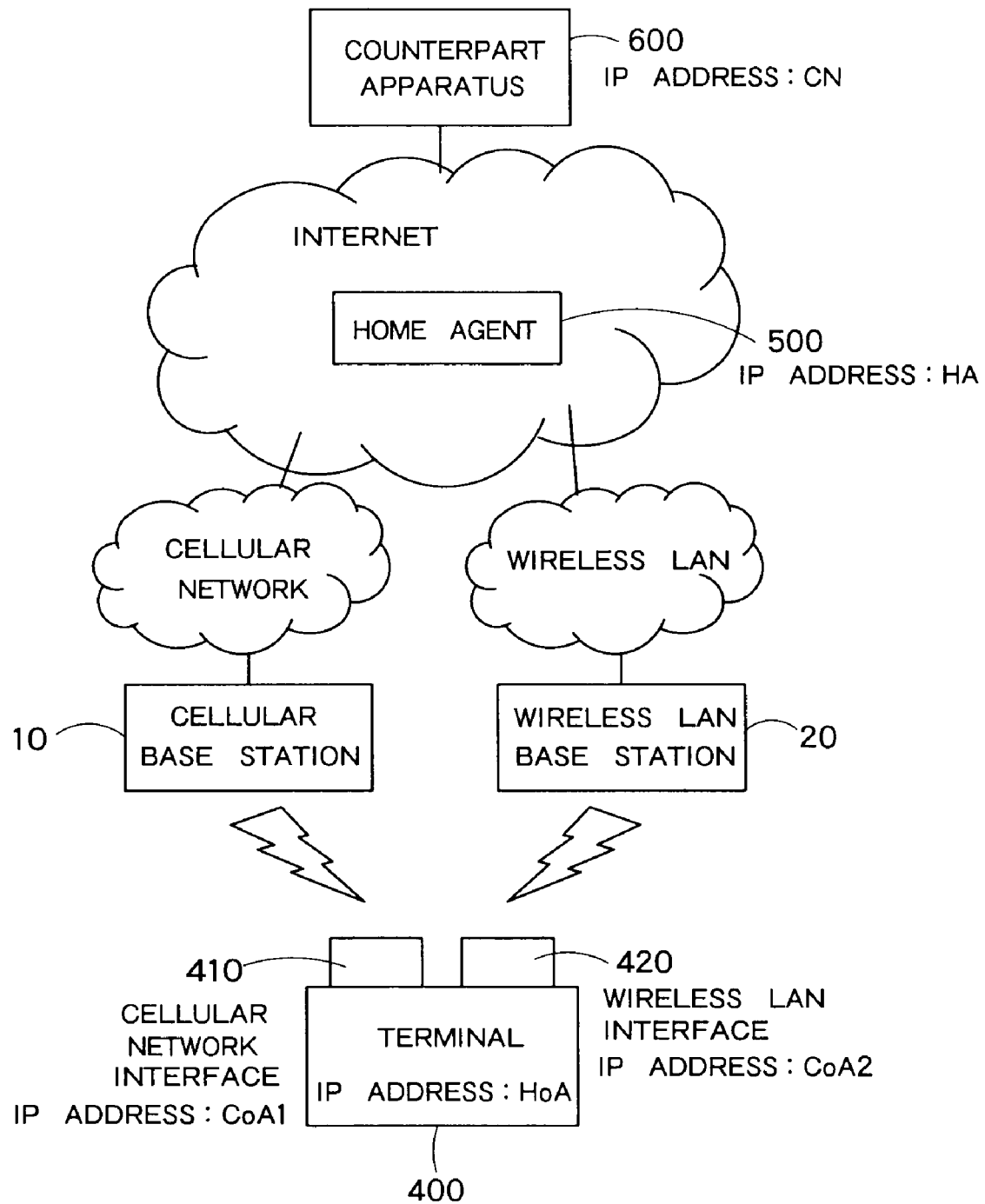
FIG. 15 is a diagram illustrating the schematic configuration of a communication system according to a second embodiment.

FIG. 15 shows the schematic configuration of a communication system according to a second embodiment of the present invention. A terminal 400 communicates with a counterpart apparatus 600 on the Internet. The terminal 400 includes a cellular network interface 410, and can be connected to a cellular network through a cellular base station 10. Further, the terminal 400 includes a wireless LAN interface 420, and can be connected to a wireless LAN through a wireless LAN base station 20.

A home agent 500 is an apparatus that provides a mobility function to the terminal 400. The home agent 500 uses an IP-in-IP tunneling protocol to establish a tunnel through a cellular network and/or a wireless LAN between the terminal 400 and the home agent 500, and uses the tunnel to relay a communication packet between the counterpart apparatus 600 and the terminal 400.

Similar to the first embodiment, IP addresses that are allocated to the cellular network interface 410 of the terminal 400, the wireless LAN interface 420 thereof, the home agent 500, and the counterpart apparatus 600 are CoA1, CoA2, HA, and CN, respectively. Further, it is assumed that an IP address HoA is allocated to the terminal 400.

FIG. 16 shows the schematic configuration of the terminal 400. The terminal 400 has a network stack 401, a mobility protocol module 402, an application module 403, a tunnel device module 404, a handover trigger module 405, a storage unit 406, a packet monitoring module 407, a cellular network interface 410, and a wireless LAN interface 420.

The network stack 401 processes a transport protocol, such as TCP, UDP, SCTP, DCCP, and ICMP, and a network protocol, such as IPv4 and IPv6. The network stack 401 outputs a packet, which is received from the cellular network interface 410 or the wireless LAN interface 420 and tunneled by the IP-in-IP protocol, to the packet monitoring module 407.

Further, the network stack 401 outputs the packet, which is received from the packet monitoring module 407, to the tunnel device module 404.

Further, the network stack 401 outputs application data of the packet, which is received from the tunnel device module 404, to the application module 403. Further, the network stack 401 outputs a data portion other than an IP header and an UDP header of a Registration Reply message, which is received from the cellular network interface 410 or the wireless LAN interface, to the mobility protocol module 402.

Further, the network stack 401 adds the UDP header and the IP header to the Registration Request message received from the mobility protocol module 402, and outputs the Registration Request message to the cellular network interface 410 or the wireless LAN interface 420.

The mobility protocol module 402 is a module that generates or processes a message of Mobile IPv4. The mobility protocol module 402 generates the Registration Request message and outputs the Registration Request message to the network stack 401. Further, the mobility protocol module 402 receives the Registration Reply message from the network stack 401 and processes the Registration Reply message.

Further, the mobility protocol module 402 receives a notification message from the network stack 401 and outputs the data indicating the characteristic of a packet described in the notification message, to the packet monitoring module 407.

Further, when the mobility protocol module 402 receives a notification, which indicates that the packet matches the characteristic is detected, from the packet monitoring module 407, the mobility protocol module 402 deletes the configuration of the tunnel that is used before the handover stored in the storage unit 406.

The application module 403 processes and analyzes application data that is received from the network stack 401. Further, the application module 403 transmits the application data to the network stack 401.

The tunnel device module 404 receives the tunneled packet from the network stack 401, and outputs the packet excluding the IP header of the packet to the network stack 401.

The handover trigger module 405 determines the point of time to start the handover. For example, the handover trigger module 405 acquires from the cellular network interface 410 and/or the wireless LAN interface 420 information related to a communication quality in the cellular network and/or the wireless LAN, determines the point of time to start the handover on the basis of the information or the other information, and notifies the mobility protocol module 402 at the time.

The storage unit 406 stores configuration of the tunnel. Further, the storage unit 406 stores data that indicates a characteristic of the packet output from the packet monitoring module 407.

The packet monitoring module 407 stores data indicating a characteristic of the packet, which is output from the mobility protocol module 402, in the storage unit 406. Further, the packet monitoring module 407 determines whether the packet output from the network stack 401 matches the characteristic that is stored in the storage unit 406, notifies the mobility protocol module 402 of information indicating that the characteristic of the output packet matches to the characteristic of the stored packet, when the output packet matches to the characteristic, and outputs the packet to the network stack 401.

The cellular network interface 410 and the wireless LAN interface 420 are the same as the cellular network interface 410 and the wireless LAN interface 420 according to the first embodiment. Therefore, the detailed description thereof will not be repeated.

FIG. 17 shows the schematic configuration of the home agent 500. The home agent 500 has a network stack 501, a mobility protocol module 502, a tunnel device module 503, a storage unit 504, and a network interface 510.

The network stack 501 processes a transport protocol, such as TCP, UDP, SCTP, DCCP, and ICMP, and a network protocol, such as IPv4 and IPv6. The network protocol 501 outputs a packet, which is received from the network interface 510, to the tunnel device module 503.

Further, the network stack 501 outputs a packet which is tunneled by tunnel device module 503 using the IP-in-IP protocol, to the network interface 510.

Further, the network stack 501 outputs a data portion other than an IP header and an UDP header of a Registration Request message, which is output from the network interface 510, to the mobility protocol module 502.

Further, the network stack 501 adds the UDP header or the IP header to a Registration Reply message and a notification message received from the mobility protocol module 502, and outputs the Registration Reply message and the notification message to the network interface 510.

The mobility protocol module 502 is a module that generates and processes a message of Mobile IPv4. The mobility protocol module 502 receives the Registration Request message from the network stack 501 and processes the Registration Request message.

Further, the mobility protocol module 502 generates a Registration Reply message and outputs the Registration Reply message to the network stack 501. Further, the mobility protocol module 502 stores configuration of a tunnel according to contents of the Registration Request message in the storage unit 504.

Further, the mobility protocol module 502 acquires contents of a packet, which is obtained by adding the IP header to the packet that the tunnel device module 503 outputs to the network stack 501, from the tunnel device module 503.

The tunnel device module 503 adds the IP header according to the configuration of the tunnel, which is stored in the storage unit 504, to the packet output from the network stack 501, and outputs the packet to the network stack 501.

Further, the tunnel device module 503 outputs contents of the final packet, which is transferred to the terminal 400 through the network used before the handover, to the mobility protocol module 502.

The storage unit 504 stores the configuration of the tunnel.

The network interface 510 supports a communication protocol, such as Ethernet. The network interface 510 outputs the received packet to the network stack 501. Further, the network interface 510 transmits the packet that is output from the network stack 501.

Figure 18:
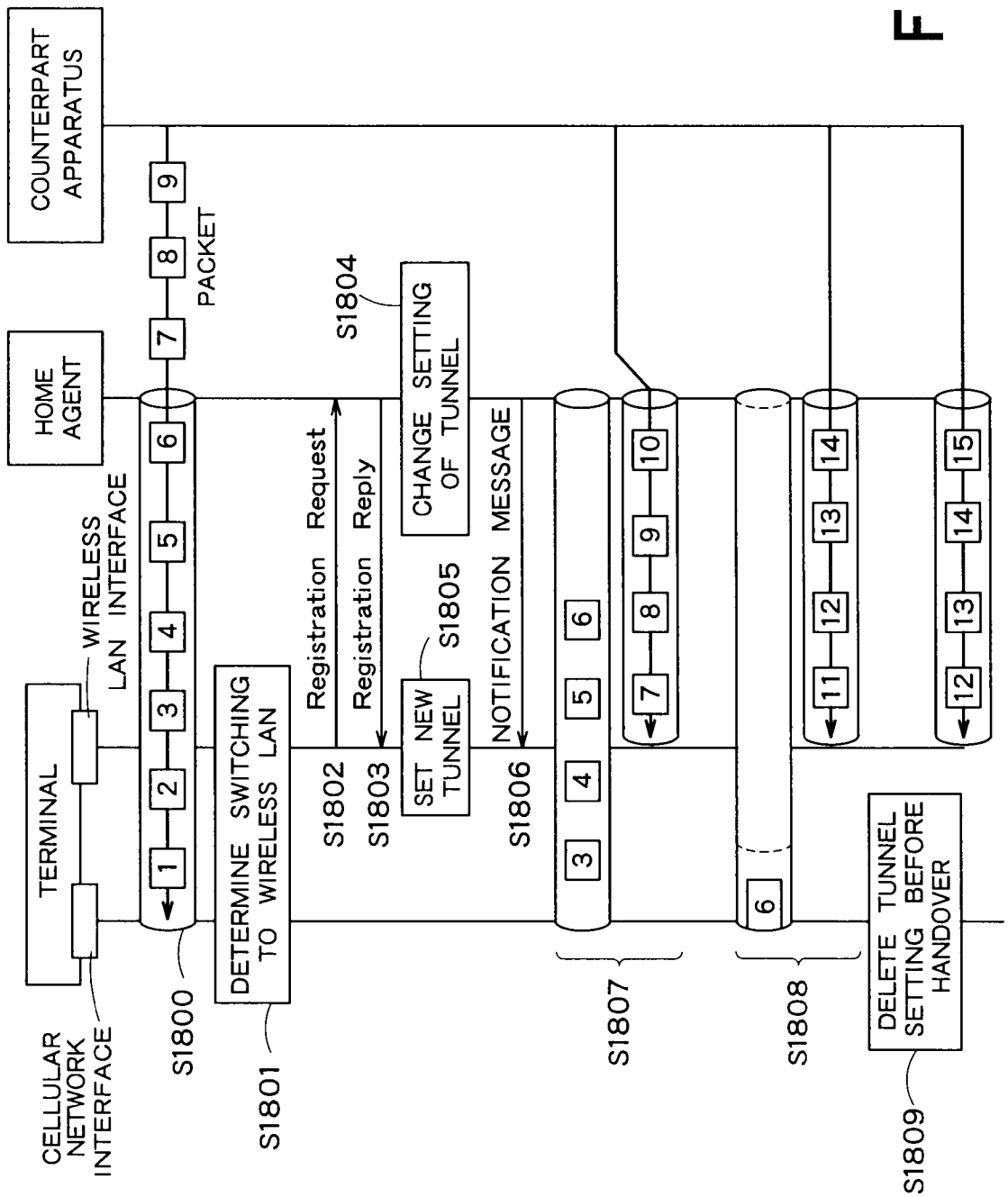
FIG. 18 is a diagram illustrating a process flow at the time of a handover in the communication system according to the second embodiment.

The process flow at the time of a handover in the communication system will be described using FIG. 18. In this embodiment, the case where the terminal 400 switches from the cellular network to the wireless LAN will be described.

(Step S1800) The terminal 400 uses the tunnel through the cellular network that is established between the terminal 400 and the home agent 500 and receives a packet transmitted from the counterpart apparatus 600. At this time, in the storage unit 406 of the terminal 400, a tuple of CoA1 which is the IP address of the cellular network interface 410 and HA which is the IP address of the home agent 500 is stored as one tunnel configuration.

The home agent 500 uses the IP-in-IP tunneling protocol and transmits the packet, which is transmitted from the counterpart apparatus 600, to the terminal 400.

If the cellular network interface 410 of the terminal 400 receives the packet shown in FIG. 7 that is transferred from the home agent 500, the cellular network interface 410 outputs the packet to the network stack 401.

The network stack 401 detects that the next header to the external IP header of the packet is an IP header, and outputs the packet to the tunnel device module 404.

The tunnel device module 404 acquires tunnel configuration from the storage unit 406, and compares the tuple of two IP addresses included in the tunnel configuration with the tuple of the destination address and the source address in the external IP header. As the comparison result, when the two tuples are the same, the tunnel device module 404 determines that the packet is a normal packet, deletes the external IP header of the packet, and outputs the packet to the network stack 401.

The network stack 401 of the terminal 400 detects that the next header to the IP header is a transport protocol header, and executes a reception process according to a specification of the transport protocol. Then, the network stack 401 outputs application data of the packet to the application module 403.

The application module 403 uses the received application data to execute a predetermined process.

Further, the home agent 500 capsulates the packet which is received from the counterpart apparatus 600 and has the destination address as HoA, by IP-in-IP tunneling protocol, and transfers the capsulated packet to the cellular network interface 410 of the terminal 400.

At this time, in the storage unit 504 of the home agent 500, a tuple of three IP addresses that include HoA which is the IP address of the terminal 400, HA which is the IP address of the home agent 500, and the CoA1 which is IP address of the cellular network interface 410 on the terminal 400 is stored as tunnel configuration.

If the network interface 510 of the home agent 500 receives from the counterpart apparatus 600 a packet where the destination address is HoA, which is shown in FIG. 6, the network interface 510 outputs the packet to the network stack 501.

Since the destination address of the packet is HoA, the network stack 501 detects that the packet is a packet to be output to the tunnel device module 503, and outputs the packet to the tunnel device module 503.

The tunnel device module 503 acquires configuration of the tunnel including the IP address HoA from the storage unit 504. In addition, the tunnel device module 503 adds an external IP header where the IP address CoA1 of the cellular network interface 410 of the terminal 400 included in the configuration of the tunnel is set to the destination address and the IP address HA of the home agent 500 included in the configuration of the tunnel is set to the source address to the packet, thereby generating a packet shown in FIG. 7.

In addition, the tunnel device module 503 outputs the packet to the network stack 501.

The network stack 501 outputs the packet, which is received from the tunnel device module 503, to the network interface 510. The network interface 510 transmits the packet, which is received from the network stack 501, to the outside.

(Step S1801) The handover trigger module 405 of the terminal 400 determines to start a handover (switching from the cellular network to the wireless LAN).

The handover trigger module 405 always acquires, from the cellular network interface 410 and/or the wireless LAN interface 420, information related to a communication quality in the cellular network and/or the wireless LAN.

In addition, if the information or the other information satisfies a predetermined condition, the handover trigger module 405 determines the point of time to start the handover, and notifies the mobility protocol module 402 of the determination at the time.

Further, an algorithm that is used when the handover trigger module 405 determines the point of time to start the handover is not limited. As an example, there is a method in which the terminal 400 starts handover when the strength of an electric wave received from the wireless LAN base station 20 becoming sufficiently strong.

(Step S1802) The Registration Request message is transmitted to the home agent 500 from the terminal 400 through the wireless LAN.

If the mobility protocol module 402 receives a notification indicating a handover start from the handover trigger module 405, the mobility protocol module 402 of the terminal 400 generates a Registration Request message.

However, the mobility protocol module 402 set 0 to Sbit of the Registration Request message, a value other than 0 to a Lifetime field, an IP address HoA allocated to the terminal 400 to a Home Address field, an IP address HA of the home agent 500 to a Home Agent field, and an IP address CoA2 of the wireless LAN interface 420 of the terminal 400 to a Care-of address field, as shown in FIG. 19.

The mobility protocol module 402 outputs the generated Registration Request message to the network stack 401.

The network stack 401 adds a UDP header where the destination port number is 434 to the Registration Request message. Further, it is assumed that the value set to the source port number of the UDP header by the network stack 401 is UP.

Further, the network stack 401 adds an IP header where the destination address is an IP address HA of the home agent 500 and the source address is an IP address CoA2 of the wireless LAN interface 420 of the terminal 400 to the Registration Request message, and generates a Registration Request message shown in FIG. 19.

The network stack 401 outputs the Registration Request message to the wireless LAN interface 420. The wireless LAN interface 420 transmits the received Registration Request message to the home agent 500.

The Registration Request message that is transmitted from the terminal 400 is received in the network interface 510 of the home agent 500 through the wireless LAN. The network interface 510 outputs the received Registration Request message to the network stack 501.

Since the transport protocol header of the Registration Request message is UDP and the destination port number is 434, the network stack 501 detects that the destination of the Registration Request message is the mobility protocol module 502, and outputs the detection result to the mobility protocol module.

The mobility protocol module inspects contents of the Registration Request message.

(Step S1803) When the home agent 500 accepts the request with the Registration Request message, the home agent 500 transmits the Registration Reply message to the wireless LAN interface 420 of the terminal 400.

The mobility protocol module 502 of the home agent 500 generates a Registration Reply message. However, the mobility protocol module 502 set 0 to the Code field of the Registration Reply message, the IP address HoA allocated to the terminal 400 to the Home Address field, and the IP address HA of the home agent 500 to the Home Agent field, as shown in FIG. 20.

In addition, the mobility protocol module 502 of the home agent 500 outputs the generated Registration Reply message to the network stack 501.

The network stack 501 adds a UDP header where the source port number is 434 and the destination port number is UP to the Registration Reply message.

Further, the network stack 501 adds an IP header where the destination address is the IP address CoA2 of the wireless LAN interface 420 on the terminal 400 and the source address is the IP address HA of the home agent to the Registration Reply message.

In addition, the network stack 501 outputs the Registration Reply message to the network interface 510. The network interface 510 transmits the received Registration Reply message to the wireless LAN interface 420 of the terminal 400.

(Step S1804) The home agent 500 changes configuration of the tunnel.

The mobility protocol module 502 of the home agent 500 stores the tuple of CoA2 which is the IP address of the wireless LAN interface 420 of the terminal 400 and is set to the Care-of Address field of the Registration Request message, HA which is the IP address of the home agent 500 and is set to the Home Agent field, and HoA which is the IP address of the terminal 400 and is set to the Home Address field, as new tunnel configuration in the storage unit 504.

In addition, the mobility protocol module 502 deletes the tunnel configuration composed of the tuple of the three IP addresses including the IP address HoA of the terminal 400, the IP address HA of the home agent 500, and the IP address CoA1 of the cellular network interface 410 of the terminal 400, which is stored in the storage unit 504.

(Step S1805) The terminal 400 configures a new tunnel needed to receive the packet transferred from the home agent 500 through the wireless LAN by the wireless LAN interface 420.

The wireless LAN interface 420 of the terminal 400 outputs the received Registration Reply message to the network stack 401.

Since the transport protocol header of the Registration Reply message is a UDP and the destination port number is UP, the network stack 401 detects that the destination of the Registration Reply message is the mobility protocol module 402, and outputs the Registration Reply message to the mobility protocol module 402.

Since the Code field of the Registration Reply message is 0, the mobility protocol module 402 detects that the home agent 500 accepts contents of the Registration Request message. Further, the mobility protocol module 402 stores, in a storage unit 406, a tuple of the IP address CoA2 of the wireless LAN interface 420 and the IP address HA of the home agent 500 as new tunnel configuration.

(Step S1806) The home agent 500 transmits the notification message to the wireless LAN interface 420 of the terminal 400 through the wireless LAN.

The mobility protocol module 502 of the home agent 500 acquires the final packet transmitted to the cellular network interface 410 of the terminal 400 by the home agent 500 before Step S1804 from the tunnel device module 503. In addition, the mobility protocol module 502 generates a notification message.

The notification message includes data indicating the characteristic of the final packet transmitted to the cellular network interface 410 of the terminal 400 by the home agent 500 before Step S1804.

The data may be a value of a checksum field in the IP header of the packet or a packet.

Next, the mobility protocol module 502 outputs a notification message to the network stack 501.

The network stack 501 adds to the received notification message a UDP header where the source port number is 434 and the destination port number is UP, as shown in FIG. 21. Further, the network stack 501 adds an IP header where the source address is the IP address HA of the home agent 500 and the destination address is the IP address CoA2 of the wireless LAN interface 420 of the terminal 400.

The network stack 501 outputs the notification message to the network interface 510. The network interface transmits the received notification message to the wireless LAN interface 420.

FIG. 21 shows an example of a notification message in the case where data indicating the characteristic of the final packet transmitted to the cellular network interface 410 of the terminal 400 by the home agent 500 before Step S1804 is the value of a checksum field.

The wireless LAN interface 420 of the terminal 400 outputs the received notification message to the network stack 401.

Since the destination port number of the received notification message is UP, the network stack 401 detects that the destination of the notification message is the mobility protocol module 402, and outputs the data excluding the IP header and the UDP header of the notification message to the mobility protocol module 402.

The mobility protocol module 402 outputs data indicating the characteristic of the final packet that is transmitted to the cellular network interface 410 of the terminal 400 by the home agent 500 before Step S1804, which is described in the received data, to the packet monitoring module 407. For example, when the data has the value of the checksum field in the IP header of the packet, the mobility protocol module 402 outputs the value of the checksum field to the packet monitoring module 407.

The packet monitoring module 407 stores the received data in the storage unit 406. The packet monitoring module 407 directs the network stack 401 to output all subsequent received packets to the packet monitoring module 407.

(Step S1807) If the home agent 500 receives a packet where the destination address transmitted from the counterpart apparatus 600 is HoA, the home agent 500 transfers the packet to the wireless LAN interface 420 of the terminal 400.

If the network interface 510 of the home agent 500 receives from the counterpart apparatus 600 a packet where a destination address is HoA, which is shown in FIG. 6, the network interface 510 outputs the packet to the network stack 501.

Since the destination address of the packet is HoA, the network stack 501 detects that the packet is the packet delivered to the tunnel device module 503, and outputs the packet to the tunnel device module 503.

The tunnel device module 503 acquires configuration of the tunnel including the IP address HoA from the storage unit 504. The configuration of the tunnel that includes the IP address HoA and is stored in the storage unit 504 is configuration that includes the IP address HoA, the IP address CoA2 of the wireless LAN interface 420 of the terminal 400, and the IP address HA of the home agent 500.

Accordingly, the tunnel device module 503 adds an external IP header where the destination address is CoA2 and the source address is HA to the packet, and generates a packet shown in FIG. 10.

The tunnel device module 503 outputs the packet to the network stack 501, and the network stack 501 outputs the received packet to the network interface 510. The network interface 510 transmits the received packet to the wireless LAN interface 420.

The terminal 400 receives a packet that the home agent 500 transfers to the wireless LAN interface 420 and a packet that the home agent 500 transfers the cellular network interface 410 before Step S1804.

If the cellular network interface 410 of the terminal 400 receives the packet that is transferred from the home agent 500, the cellular network interface 410 outputs the packet to the network stack 401.

The network stack 401 outputs the received packet to the packet monitoring module 407.

In addition, the packet monitoring module 407 compares the characteristic (for example, value of a checksum field in the IP header) of the packet that is finally transmitted to the cellular network interface 410 by the home agent 500 before Step S1804 and stored in the storage unit 406, and the characteristic of the packet that is received from the network stack 401.

After the comparison, the packet monitoring module 407 outputs the packet to the network stack 401.

The network stack 401 detects that the next header to the external IP header of the packet is an IP header, and outputs the packet to the tunnel device module 404.

The tunnel device module 404 acquires the configuration of the tunnel from the storage unit 406, and compares the tuple of two IP addresses included in the configuration of the tunnel and the tuple of the destination address and the source address in the external IP header.

As the comparison result, when the tuples are the same, the tunnel device module 404 determines that the packet is a normal packet, deletes the external IP header of the packet, and outputs the packet to the network stack 401.

The network stack 401 of the terminal 400 detects that the next header to the IP header is a transport protocol header, and executes a reception process according to a specification of the transport protocol. Then, the network stack 401 outputs application data of the packet to the application module 403.

The application module 403 uses the received application data to execute a predetermined process.

(Step S1808) If the characteristic stored in the storage unit 406 and the characteristic of the packet that the packet monitoring module 407 receives from the network stack 401 are the same, the packet monitoring module 407 outputs notification indicating the two characteristics are same, to the mobility protocol module 402.

(Step S1809) The mobility protocol module 402 deletes the configuration of the tunnel (configuration of the tunnel before the handover) matched to the tuple of the IP address CoA1 of the cellular network interface 410 and the IP address HA of the home agent 500 from the storage unit 406, on the basis of the notification that is received from the packet monitoring module 407.

Thereby, when the cellular network interface 410 of the terminal 400 receives the packet shown in FIG. 7, the tunnel device module 404 of the terminal 400 determines that the packet is an abnormal packet because the configuration of the tunnel matched with the source address and the destination address of the external IP header of the packet does not exist in the storage unit 406, and can discard the packet.

As such, in this embodiment, the home agent transmits a notification message indicating the characteristic of the final tunneled packet, which is transferred to the terminal before the handover process, immediately after the handover through the network used after the handover. Further, the terminal receives the notification message, and detects the point of time when the packet corresponding to the packet indicated by the notification message is received through the network used before the handover as the point of time when the tunnel used before the handover can be deleted.

For this reason, even though a packet loss may be occurred on the network that is used by the terminal before the handover, the terminal receives all of the packets that are transferred from the home agent through the tunnel used before the handover and can detect the point of time when the tunnel can be deleted.

The point of time when the tunnel can be deleted is detected and the tunnel is deleted, thereby quickly cutting power that is supplied to the interface of the terminal corresponding to the network used before the handover, without causing the packet loss. Accordingly, it is possible to reduce power consumption.

Further, since it is possible to quickly release a memory resource that is used to hold configuration for allowing the packet transferred from the home agent to be received by the interface of the terminal corresponding to the network used before the handover, the memory resource can be effectively used.

In the second embodiment, the terminal and the home agent uses Mobile IPv4 as a mobility protocol, but Mobile IPv6 may be used instead of the Mobile IPv4.

When the terminal and the home agent use Mobile IPv6, the terminal and the home agent support Multiple Care-of Address Registration function of the standardization. In addition, a Binding Update message of the Mobile IPv6 may be used instead of the Registration Request message and a Binding Acknowledgement message may be used instead of the Registration Reply message.

When the terminal uses the Binding Update message, a C flag field in a Binding Identifier Mobility Option of the Binding Update message is set to 1 and a Status field of a Binding Acknowledgement message is inspected. Thereby, a message, such as the ICMP Echo Request message, may be transmitted, when the home agent does not supports the Multiple Care-of Address Registration function.

In the second embodiment, the terminal may transmit the packet tunneled in Steps S1800, S1807, and S1808 to the home agent 500, thereby transmitting the packet to the counterpart apparatus 300.

In the second embodiment, the terminal may stop the operation of the network interface used before the handover or stop power supply, after deleting the configuration of the tunnel used before the handover or immediately before deleting the configuration of the tunnel.

Further, in the second embodiment, the terminal may stop the operation of the network interface used before the handover or stop power supply, instead of deleting the configuration of the tunnel used before the handover.

Further, in the second embodiment, the tunnel device module 404 of the terminal may use a GRE tunnel or the other tunneling protocol, instead of the IP-in-IP tunneling protocol.

Further, in the second embodiment, the terminal and the home agent may use a protocol having a sequence number field such as a GRE tunnel or ESP, and AH in a protocol header, instead of the IP-in-IP tunneling protocol, and may use a value of the sequence number field, instead of a value of a checksum field of an IP header. Further, the terminal may detect the point of time when all of the packets, each of which has a value of a sequence number field smaller than the value of the sequence number field, are received as the point of time when the tunnel used before the handover can be deleted.

In this case, even though a transfer order of the packets is changed on the network used before the handover, the terminal can detect the point of time when all of the packets that are transferred from the home agent through the tunnel used before the handover can be received and the tunnel can be deleted.

Further, in the second embodiment, the example where the Mobile IPv4 is used as a mobility protocol has been described, but the mobility protocol may be Mobile IPv6, MOBIKE, or any one of the other protocols. When the mobility protocol is not the Mobile IPv4, instead of Registration Reply and the Registration Request of the Mobile IPv4, the protocol is defined by a specification of Mobile IPv6 or MOBIKE and specifications of the other mobility protocols. The message that is needed for the handover is transmitted and received by the terminal and the home agent.

Third Embodiment

Since a communication system according to a third embodiment of the present invention is the same as a communication system according to the second embodiment shown in FIG. 15, the description thereof will not be repeated.

Further, since the terminal according to this embodiment has the same configuration as the terminal according to the second embodiment shown in FIG. 16, the description thereof will not be repeated. However, the functions of the mobility protocol module 402, the tunnel device module 404, and the packet monitoring module 407 are different from those of the second embodiment.

The mobility protocol module 402 of the terminal 400 according to this embodiment is a module that generates and processes a message of the Mobile IPv4. The mobility protocol module 402 generates the Registration Request message and outputs the Registration Request message to the network stack 401.

Further, the mobility protocol module 402 receives the Registration Reply message from the network stack 401 and processes the Registration Reply message.

Further, the mobility protocol module 402 receives a sequence number in a header of the first packet, which is transferred from the home agent 500 through the network used immediately after the handover, from the packet monitoring module 407.

Further, the mobility protocol module 402 outputs a value obtained by subtracting 1 from the sequence number and an IP address of the interface corresponding to the network used before the handover to the packet monitoring module 407.

Further, the mobility protocol module 402 deletes configuration of the tunnel that is stored in the storage unit 406 and used before the handover, when the notification is received from the packet monitoring module 407.

The tunnel device module 404 uses a tunneling protocol such as GRE where the sequence number can be set to the protocol header, and outputs the tunneled packet received from the network stack 401 excluding the header of the tunneled protocol and the IP header to the network stack 401.

The packet monitoring module 407 stores the sequence number, which is received from the mobility protocol module 402, in the storage unit 406. Further, the packet monitoring module 407 determines whether the tunneled packet received from the network stack 401 is matched with the sequence number stored in the storage unit 406, and notifies the mobility protocol module 402 of that the tunneled packet is matched with the sequence number, when the tunneled packet is matched with the sequence number.

Further, the packet monitoring module 407 outputs the packet to the network stack 401 after the determination.

Since the home agent according to this embodiment has the same configuration as the home agent according to the second embodiment shown in FIG. 17, the description thereof will not be repeated. However, the functions of the mobility protocol module 502 and the tunnel device module 503 are different from those of the second embodiment.

The mobility protocol module 502 is a module that generates and processes a message of Mobile IPv4. The mobility protocol module 502 receives the Registration Request message from the network stack 501 and processes the Registration Request message.

Further, the mobility protocol module 502 generates a Registration Reply message and outputs the Registration Reply message to the network stack 501. Further, the mobility protocol module 502 stores configuration of a tunnel according to contents of the Registration Request message in the storage unit 504.

Further, the mobility protocol module 502 may not have a function to acquire the contents of the packet (that the tunnel device module 503 receives from the network stack 501) where the IP header is added from the tunnel device module 503.

The tunnel device module 503 adds the IP header according to the configuration of the tunnel stored in the storage unit 504 to the packet received from the network stack 501 and outputs the packet to the network stack 501.

Further, the tunnel device module 503 may not have a function to output contents of the final packet, which is transferred to the terminal 400 through the network used before the handover, to the mobility protocol module 502.

Figure 22:
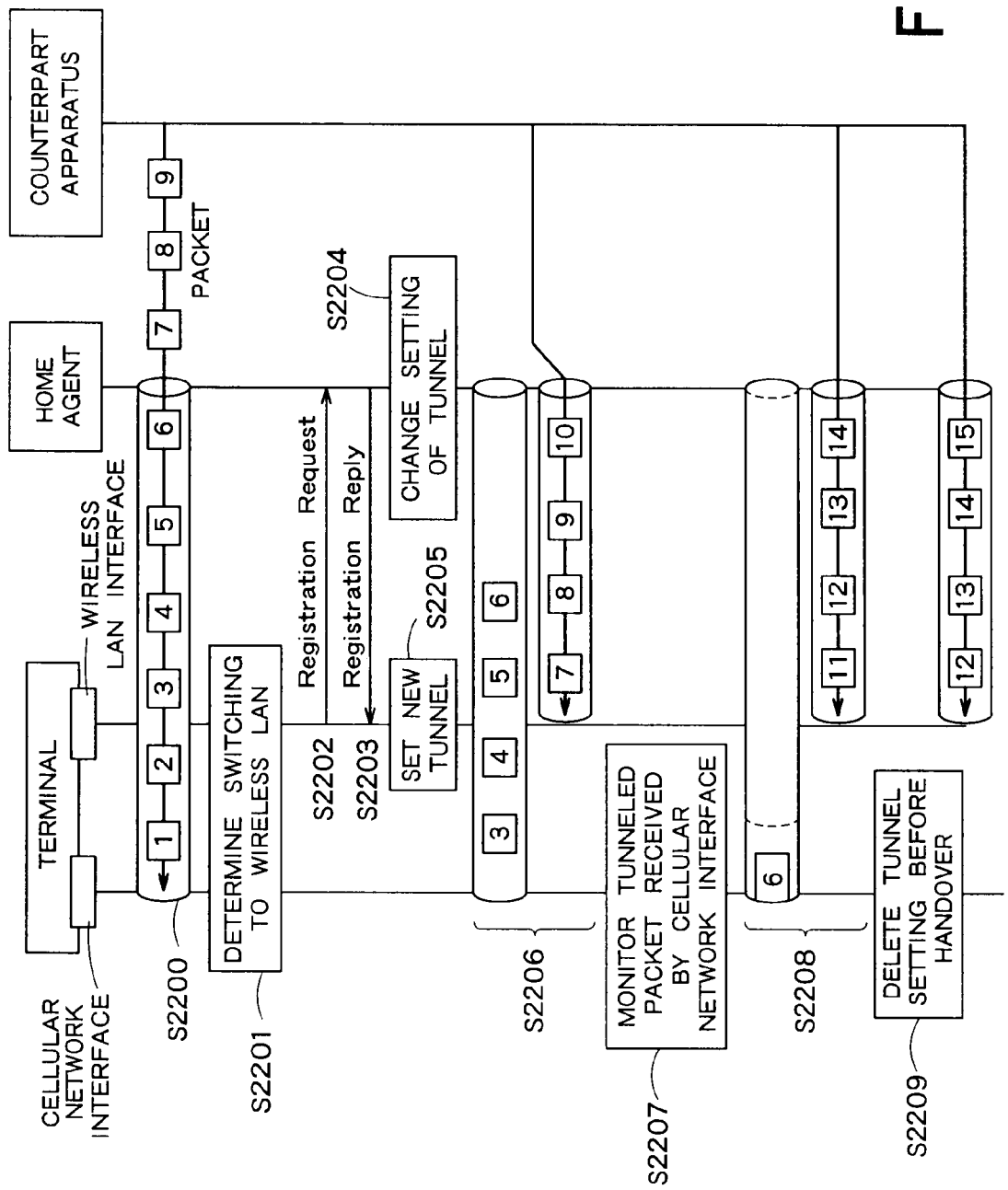
FIG. 22 is a diagram illustrating a process flow at the time of a handover in the communication system according to a third embodiment.

The process flow at the time of a handover in the communication system will be described using FIG. 22. In this embodiment, the case where the used network is switched from the cellular network to the wireless LAN will be described.

(Step S2200) The terminal 400 uses the tunnel through the cellular network that is established between the terminal 400 and the home agent 500 and receives a packet transmitted from the counterpart apparatus 600.

At this time, in the storage unit 406 of the terminal 400, a tuple of the IP address CoA1 of the cellular network interface 410 and the IP address HA of the home agent 500 is stored as one tunnel configuration.

The home agent 500 capsulates the packet, which is received from the counterpart apparatus 600 and has a destination address as HoA, by GRE, and transfers the capsulated packet to the cellular network interface 410 of the terminal 400.

That is, if the network interface 510 of the home agent 500 receives from the counterpart apparatus 600 a packet where the destination address is HoA, which is shown in FIG. 6, the network interface 510 outputs the packet to the network stack 501.

Since the destination address of the received packet is HoA, the network stack 501 detects that the destination of the packet is the tunnel device module 503, and outputs the packet to the tunnel device module 503.

The tunnel device module 503 acquires configuration of the tunnel including the IP address HoA from the storage unit 504. In addition, the tunnel device module 503 adds a GRE header where a Protocol type field is 0800 to the packet.

However, in the sequence number field of the GRE header, a value that is obtained by adding 1 to a value of the sequence number field of the GRE header of the previously tunneled and transferred packet to terminal 400 is set.

If the value of the sequence number field of the previously transferred packet is 0xffffffff in hexadecimal, the sequence number field of the GRE header is set to 1.

An external IP header where the IP address CoA1 of the cellular network interface 410 of the terminal included in the configuration of the tunnel is set to the destination address and the IP address HA of the home agent 500 included in the configuration of the tunnel is set to a source address is added to the packet, thereby generating a packet shown in FIG. 23.

The tunnel device module 503 outputs the packet to the network stack 501, and the network stack 501 outputs the received packet to the network interface 501.

The network interface 510 transmits the received packet to the cellular network interface 410.

If the cellular network interface 410 of the terminal 400 receives the packet shown in FIG. 23 that is transferred from the home agent 500, the cellular network interface 410 outputs the packet to the network stack 401.

The network stack 401 detects that the next header to the external IP header of the packet is the GRE header, and outputs the packet to the tunnel device module 404.

The tunnel device module 404 acquires tunnel configuration from the storage unit 406, and compares the tuple of two IP addresses included in the tunnel configuration and the tuple of a destination address and a source address in the external IP header.

As the comparison result, when the two tuples are the same, the tunnel device module 404 determines that the packet is a normal packet, deletes the external IP header and the GRE header of the packet, and outputs the packet to the network stack 401.

The network stack 401 of the terminal 400 detects that the next header to the IP header is a transport protocol header, and executes a reception process according to a specification of the transport protocol. Then, the network stack 401 outputs application data of the packet to the application module 403.

The application module 403 uses the received application data to execute a predetermined process.

Since Steps S2201 to S2204 are the same as Step S1801 to S1804 in the second embodiment, the description thereof is not described. However, the third embodiment is different from the second embodiment in that the mobility protocol module 402 set 1 to Sbit of the Registration Request message.

(Step S2205) The terminal 400 executes the same process as Step S1805 in the second embodiment and stores configuration of a new tunnel in the storage unit 406.

Further, when the first packet (tunneled by the GRE protocol) where the destination address of the external IP header is an IP address CoA2 of the wireless LAN interface 420 is detected, the mobility protocol module 402 of the terminal 400 notifies the packet monitoring module 407 of the detection, such that the detection is notified to the mobility protocol module 402.

(Step S2206) If the home agent 500 receives the packet where the destination address is HoA from the counterpart apparatus 600, the home agent 500 capsulates the packet by GRE and transfers the packet to the wireless LAN interface 420 of the terminal 400, during the following process.

If the network interface 510 of the home agent 500 receives from the counterpart apparatus 600 a packet where the destination address is HoA, which is shown in FIG. 6, the network interface 510 outputs the packet to the network stack 501.

Since the destination address of the packet is HoA, the network stack 501 detects that the packet is a packet to be output to the tunnel device module 503, and outputs the packet to the tunnel device module 503.

The tunnel device module 503 acquires configuration of the tunnel including the IP address HoA from the storage unit 504. In the storage unit 504, the configuration of the tunnel that includes the IP address HoA is configuration that is composed of an IP address HoA, an IP address CoA2 of the wireless LAN interface of the terminal 400, and an IP address Ha of the home agent 500.

In addition, the tunnel device module 503 adds a GRE header where a Protocol type field is 0800 to the packet. However, in the sequence number field of the GRE header, the value that is obtained by adding 1 to a value of the sequence number field of the GRE header of the packet immediately previously tunneled and transferred to the terminal 400 is set.

When the value of the sequence number field of the previously transferred packet is 0xffffffff in hexadecimal, 1 is set to the sequence number field of the GRE header.

In addition, the tunnel device module 503 adds an IP header where CoA2 is set to the destination address and HA is set to the source address to a packet, in accordance with the configuration of the tunnel acquired from the storage unit 504, thereby generating a packet shown in FIG. 24.

The tunnel device module 503 outputs the packet to the network stack 501, and the network stack 501 outputs the received packet to the network interface 510.

The network interface 510 transmits the received packet to the wireless LAN interface 420 of the terminal 400.

If the wireless LAN interface 420 of the terminal 400 receives a first packet that is transmitted from the home agent 500, the wireless LAN interface 420 outputs the packet to the network stack 410.

Next, the network stack 401 outputs the packet to the packet monitoring module 407.

The packet monitoring module 407 determines whether the packet is tunneled by the GRE protocol and the destination address of the external IP header is the IP address CoA2 notified from the mobility protocol module 402 in Step S2205.

Since the source address of the external IP header of the packet is CoA2, the determination result becomes true. For this reason, the packet monitoring module 407 notifies the mobility protocol module 402 of a value of the sequence number in the GRE header of the packet, and outputs the packet to the network stack 401.

Next, the network stack 401 detects that the next header to the external IP header of the packet is a GRE header, and outputs the packet to the tunnel device module 404.

The tunnel device module 404 acquires tunnel configuration from the storage unit 406, and compares the tuple of two IP addresses included in the tunnel configuration and the tuple of the destination address and the source address in the external IP header.

As the comparison result, when the two tuples are the same, the tunnel device module 404 determines that the packet is a normal packet, and outputs a packet where the GRE header and the external IP header of the packet are deleted to the network stack 401.

Next, the network stack 401 detects that the next header to the IP header of the packet is a transport protocol header, and executes a reception process according to a specification of the transport protocol. Then, the network stack 401 outputs application data of the packet to the application module 403.

The application module 403 uses the received application data to execute a predetermined process.

Further, if the cellular network interface 410 of the terminal 400 receives the packet shown in FIG. 23 that is transferred from the home agent 500, the cellular network interface 410 outputs the packet to the network stack 401.

The network stack 401 outputs the packet to the packet monitoring module 407.

The packet monitoring module determines whether the packet is tunneled by the GRE protocol and the destination address of the external IP header is the IP address CoA2 notified from the mobility protocol module 402 in Step S2205.

Since the source address of the external IP header of the packet is CoA1, the determination result becomes false. For this reason, the packet monitoring module 407 outputs the packet to the network stack 401.

Since the following operation is the same as that in the case where the wireless LAN interface 420 receives the packet transferred from the home agent 500, the description thereof will not be repeated.

(Step S2207) In Step S2206, if the mobility protocol module 402 of the terminal 400 receives the sequence number from the packet monitoring module 407, the terminal 400 executes the following process.

The mobility protocol module 402 notifies the packet monitoring module 407 of the monitoring of the packet received by the wireless LAN interface 420 being stopped.

Next, the mobility protocol module 402 adds the value obtained by subtracting 1 from the sequence number notified from the packet monitoring module 407 and the IP address of the cellular network interface 410 to the packet monitoring module 407.

However, if the sequence number that is notified from the packet monitoring module 407 is 1, 0xffffffff in hexadecimal is added to the packet monitoring module 407 as the sequence number.

Thereby, the packet monitoring module 407 monitors all of the packets that are received by the cellular network interface 410.

(Step S2208) The final packet that is transmitted to the cellular network interface 410 of the terminal 400 from the home agent 500 before Step S2204 is received.

The cellular network interface 410 of the terminal 400 outputs the received packet to the network stack 401.

The network stack 401 outputs the packet to the packet monitoring module 407.

Next, the packet monitoring module 407 compares the value of the sequence number that is notified from the mobility protocol module 402 and the value of a sequence number in the RGE header. Since the packet is the final packet that is transmitted to the cellular network interface 410 of the terminal 400 from the home agent 500 before Step S2204, the comparison result becomes true.

In addition, the packet monitoring module 407 notifies the mobility protocol module 402 of the comparison result becoming true.

Next, the packet monitoring module 407 outputs the packet to the network stack 401. The network stack 401 detects that the next header to the external IP header of the packet is a GRE header, and outputs the packet to the tunnel device module 404. Since the following process is the same as the process of in the tunnel device module 404, the network stack 401, and the application module 403 in Step S2206, the description thereof will not be repeated.

Further, the process in the case that the sequence number in the GRE header in the packet received by the cellular network interface 410 between Steps S2207 and S2208 is not matched with the sequence number held by the packet monitoring module 407, is the same as the process executed by the terminal 400 in Step S2208, except that the packet monitoring module 407 does not perform a notification to the mobility protocol module 402.

(Step S2209) If the mobility protocol module 402 of the terminal 400 receives the notification from the packet monitoring module 407, the mobility protocol module 402 deletes configuration of the tunnel, which is matched with the tuple of the IP address CoA1 of the cellular network interface 410 and the IP address HA of the home agent 500, from the storage unit 406.

Thereby, when the cellular network interface 410 of the terminal 400 receives the packet shown in FIG. 23, since the configuration of the tunnel, which is matched with the source address and the destination address of the external IP header of the packet, does not exist in the storage unit 406, the tunnel device module 404 of the terminal 400 determines that the packet is an abnormal packet, and can discard the packet.

As such, in this embodiment, the home agent uses a tunneling protocol where a sequence number is described in a header of the tunneling protocol, and transmits the packet, which is received from the counterpart apparatus, to the terminal.

Further, from the contents of the first packet that is used by the terminal after the handover and received from the home agent through the network, the terminal predicts a feature of the packet, which is used by the terminal before the handover and transferred from the home agent through the network, and stores the feature of the packet.

In addition, the point of time when the characteristic of the packet, which is used by the terminal before the handover and received from the home agent through the network, is matched with the stored characteristic of the packet is detected as the point of time when the tunnel used before the handover can be deleted.

Accordingly, even though a special message is not transmitted and received by the terminal and the home agent, the terminal can delete the tunnel immediately at the point of time when the terminal completely receives all of the packets that are used before the handover and transferred from the home agent through the tunnel.

The point of time when the tunnel can be deleted is detected and the tunnel is deleted, thereby quickly cutting power that is supplied to the interface of the terminal corresponding to the network used before the handover. Accordingly, it is possible to reduce power consumption.

Further, since it is possible to quickly release a memory resource that is used to hold configuration to receive the packet transferred from the home agent by the interface of the terminal corresponding to the network used before the handover, the memory resource can be effectively used.

The terminal 400 may transmit the tunneled packet to the home agent 500 in Steps S2200, S2206, and S2208 to the home agent 500, thereby transmitting the packet to the counterpart apparatus 600.

Further, in the third embodiment, the terminal may stop the operation of the network interface used before the handover or stop power supply, after deleting the configuration of the tunnel used before the handover or immediately before deleting the configuration of the tunnel.

Further, in the third embodiment, the terminal may stop the operation of the network interface used before the handover or stop power supply, instead of deleting the configuration of the tunnel used before the handover.

Further, in the third embodiment, the tunnel device modules of the terminal may use a tunneling protocol such as ESP or AH where a sequence number can be described in a protocol header, instead of the GRE protocol.

Further, in the third embodiment, the example where the Mobile IPv4 is used as the mobility protocol has been described. However, the mobility protocol may be Mobile IPv6, MOBIKE, or any one of the other protocols.

When the mobility protocol is not the Mobile IPv4, instead of Registration Reply and the Registration Request of the Mobile IPv4, the protocol is defined by a specification of Mobile IPv6 or MOBIKE and specifications of the other mobility protocols. The message that is needed for the handover is transmitted and received by the terminal and the home agent.

In the first to third embodiments, the cellular network interfaces and the wireless LAN interfaces may be interfaces supporting Ethernet, 802.16 802.16e, Bluetooth, or infrared communication.

In the first embodiment of the present invention, the terminal may have multiple network interfaces which support same protocol and are connected to different access networks, instead of the cellular network interface and the wireless LAN interface.

In the first to third embodiments, the terminal may have two or more network interfaces, and the network used for communication with the counterpart apparatus may be changed, using the two network interfaces among the network interfaces in the terminal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile terminal that performs handover between a first network and a second network, comprising:
a first interface that transmits and receives data through the first network;
a second interface that transmits and receives data through the second network;
a handover trigger module that determines switching of a used network from the first network to the second network; and
a mobility protocol module that generates a handover request message transmitted through the second network on the basis of the determination, provides the handover request message to the second interface, acquires a first reply message corresponding to the handover request message from the second interface, starts transmission and reception of the packet using the second network on receiving the first reply message, generates a reply request message transmitted through the first network on the basis of the first reply message, provides the reply request message to the first interface, acquires a second reply message corresponding to the reply request message from the first interface, and stops utilization of the first network on receiving the second reply message,
wherein the mobility protocol module generates as the handover request message a Registration Request message of IPv4 in which Sbit of the handover request message is 1,
if a Registration Reply message of IPv4 where a Code field is 0 as the first reply message is acquired from the second interface, the mobility protocol module generates the Registration Request message of IPv4 as the reply request message transmitted through the first interface, and
if the Registration Reply message of IPv4 where a code field is 1 as the first reply message is acquired from the second interface, the mobility protocol module generates an ICMP Echo Request message as the reply request message transmitted through the first interface.

* * * * *